US009188710B2

(12) United States Patent
Ho et al.

(10) Patent No.: US 9,188,710 B2
(45) Date of Patent: Nov. 17, 2015

(54) LENS AND A METHOD OF FORMING THE SAME, A METHOD OF GENERATING A REFRACTIVE INDEX PROFILE FOR A LENS AND A PHOTONIC PACKAGE

(75) Inventors: Seng-Tiong Ho, Singapore (SG); Qian Wang, Singapore (SG); Yingyan Huang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 633 days.

(21) Appl. No.: 13/576,650

(22) PCT Filed: Feb. 2, 2011

(86) PCT No.: PCT/SG2011/000048
§ 371 (c)(1),
(2), (4) Date: Oct. 17, 2012

(87) PCT Pub. No.: WO2011/096895
PCT Pub. Date: Aug. 11, 2011

(65) Prior Publication Data
US 2013/0039620 A1    Feb. 14, 2013

Related U.S. Application Data

(60) Provisional application No. 61/301,817, filed on Feb. 5, 2010.

(51) Int. Cl.
| G02B 3/00 | (2006.01) |
| G02B 3/02 | (2006.01) |
| G02B 6/124 | (2006.01) |
| G02B 6/028 | (2006.01) |

(52) U.S. Cl.
CPC .............. *G02B 3/0087* (2013.01); *G02B 3/02* (2013.01); *G02B 6/124* (2013.01); *G02B 6/028* (2013.01)

(58) Field of Classification Search
CPC ............................ G02B 3/0087; G02B 6/124
See application file for complete search history.

(56) References Cited

U.S. PATENT DOCUMENTS

| 7,426,328 B2 | 9/2008 | Zhou et al. |
| 2003/0035620 A1 | 2/2003 | Manolatou |
| 2009/0046979 A1 | 2/2009 | Zhou et al. |

OTHER PUBLICATIONS

Huang, et al., Superhigh Numerical Aperture (NA>1.5) Micro Gradient-Index Lens Based on a dual-Material Approach, 30 Optics Letters 1291 (2005).
Wang, et al., Thin-Film Stack Based Integrated GRIN Coupler with Aberration-Free Focusing and Super-High NA for Efficient Fiber-to-Nanophotonic-Chip Coupling, 18 Optics Express 4574 (2010).

*Primary Examiner* — Jerry Rahll
(74) *Attorney, Agent, or Firm* — K. David Crockett, Esq.; Niky Economy Syrengelas, Esq.; Crockett & Crockett, PC

(57) ABSTRACT

According to embodiments of the present invention, a lens comprising a refractive index profile configured such that rays of light propagating in the lens form an at least substantially plane wavefront at an at least substantially vertical plane of the lens, is provided. The profile is configured to vary in an at least substantially bell curve shape along a radial direction of the lens. The lens includes a plurality of layers configured to generate the profile, wherein each layer of the plurality of layers comprises at least a first film and a second film arranged one above the other.

5 Claims, 24 Drawing Sheets

1500

1502

1504

1506

LENS AND A METHOD OF FORMING THE SAME, A METHOD OF GENERATING A REFRACTIVE INDEX PROFILE FOR A LENS AND A PHOTONIC PACKAGE

CROSS-REFERENCE TO RELATED APPLICATION

This application claims the benefit of priority of U.S. provisional application No. 61/301,817, filed 5 Feb. 2010, the content of it being hereby incorporated by reference in its entirety for all purposes.

TECHNICAL FIELD

Various embodiments relate to a lens, a method of forming the lens and a photonic package.

BACKGROUND

Photonic integrated circuits (PICS) based on waveguide technology to manipulate light signals on a chip level can be employed in information processing, communication and optical sensing etc. For photonic integrated circuits, there are two fundamental but very important requirements 1) small waveguide cross-section with a strong light confinement so that one single chip can contain multiple integrated optical devices, and 2) low loss optical coupling to/from the photonic chip for the purpose of chip interconnection.

Nanophotonic waveguide, based on for example silicon or indium phosphide (InP) semiconductor, has a high refractive index contrast between the core and cladding, which leads to a strong light confinement with a sub-wavelength cross-section and a corresponding sub-wavelength mode field diameter. This makes it superior in dense photonic integration and promising for photonic system/network on chip. On the other hand, optical fiber is widely used for light guiding and interconnection, e.g., in optical communication. The typical mode field diameter of an optical fiber is a few micrometers (e.g., it is ~10.5 µm for a standard single mode fiber at a wavelength of 1.55 µm). Therefore, this mismatch of mode field profiles between the nanophotonic waveguide and optical fiber leads to a high coupling loss when interconnection of photonic chips is required, for example to optical fibers.

As an example, FIG. 1A shows schematic cross-sectional views of a silicon nanophotonic waveguide 100 and a single mode optical fiber 120 of the prior art, to illustrate the high coupling loss between the nanophotonic waveguide 100 and the single mode fiber 120. As shown in FIG. 1A, the silicon nanophotonic waveguide 100 includes a waveguide core 102 and a silicon-on-insulator substrate 104 including a buried silicon oxide 106 on top of a silicon substrate 108. The buried silicon oxide 106 acts as a cladding. For illustration purposes, the waveguide core 102 of the silicon nanophotonic waveguide 100 may have a width, w, of about 400 nm and a height, h, of about 300 nm. The refractive index for the silicon waveguide core 102 is about 3.45 and the refractive index for the buried silicon oxide cladding 106 is about 1.45, at the wavelength of 1.55 µm.

As a comparison, FIG. 1A also shows the cross-sectional view of a standard single mode fiber 120 including a fiber core 122 surrounded by a cladding 124. For illustration purposes, the radius, r, of the fiber core 122 is about 4.15 µm.

FIG. 1B shows a plot 130 of the mode field profile 132 of the silicon nanophotonic waveguide 100 (FIG. 1A) and the mode field profile 134 of the single mode optical fiber 120 (FIG. 1A), along the y-direction as indicated in FIG. 1A at the wavelength of 1.55 µm. As shown in FIG. 1B, the two mode field diameters or mode field profiles 132, 134, are distinctly different. Therefore, a direct butt coupling between these two optical modes may cause a coupling loss of about 20 dB due to this mismatch, even when perfect alignment between the nanophotonic waveguide 100 (FIG. 1A) and the optical fiber 120 (FIG. 1A) is achieved.

In order to reduce the coupling loss between a nanophotonic waveguide and an optical fiber, a simple and commonly used setup in laboratory involves a discrete lens with a typical millimeter size between the optical fiber and the waveguide to focus the light from the optical fiber to the nanophotonic waveguide (or expand the light beam from the nanophotonic waveguide to match the fiber). For example, FIG. 2 shows a schematic side view of a coupling arrangement 200 of the prior art, using an objective lens 202 positioned in between a waveguide 204a and a single mode optical fiber 206a. The nanophotonic waveguide 204a is placed on a waveguide holder 206a, the optical fiber 206a is placed within a fiber holder 206b and the objective lens 202 is placed in a corresponding lens holder 206c. The coupling arrangement 200 is configured such that the waveguide core 204b of the waveguide 204a and the fiber core 206b of the optical fiber 206a are aligned with each other and in addition, aligned to an optical axis, as represented by the dotted line 208, of the objective lens 202.

However, such a coupling method as illustrated by the coupling arrangement 200 of FIG. 2 has two main problems. One of the problems involves complicated assembling requirement and high packaging cost. The coupling arrangement 200 of FIG. 2 is a discrete alignment in free space, which involves 5-axis adjusters or 5-freedom adjusters for an optical fiber. FIG. 3 shows a schematic view of an optical fiber 300, illustrating a five-axis adjustment in order to adjust or align the vertical-axis y 302, the optical axis z 304, the horizontal axis x 306, the pitch angle 308 and the yaw angle 310. Therefore, proper alignment in these 5 axes is required, increasing the complexity of the optical coupling process.

In addition, as shown in FIG. 1B, a nanophotonic waveguide has a sub-wavelength spot size. However, an objective lens used for focusing light typically has a millimeter-scale size and focusing distance. Therefore, assembly based on this alignment in free space is complicated, which increases the packaging cost significantly and is not suitable for mass production.

Another problem is degraded performance of optical lens for sub-wavelength optical beams. Generally, two types of optical lens are available for applications in fiber optics, such as a conventional objective lens or a conventional graded refractive index or gradient-index lens (GRIN lens) for expanding or focusing light beams. However, both the conventional objective lens and the conventional GRIN lens have limited numerical apertures. As numerical aperture determines the resolution that can be achieved by a lens, both the conventional objective lens and the conventional GRIN lens do not have good resolution. Therefore, these available conventional lenses (eg. a GRIN lens based fiber collimator) can work reasonably well for expanding a light beam with a micro/millimeter scale beam size, but suffers from severe aberration when the light beam has a sub-wavelength spot size. As a result, coupling systems using these conventional lenses may not achieve much improvement in the coupling efficiency.

Optical coupling to a nanophotonic waveguide using, for example, an asymmetric GRIN lens with a low refractive index contrast, is no longer adequate due to the fact that the low refractive index contrast gives a low numerical aperture (NA) for the lens and therefore is not able to bend the light rays that are propagating at large angles around. In addition, even at high NA, a conventional GRIN lens with a parabolic refractive index profile is no longer adequate due to severe spatial aberration of the light beams at the focal plane, caused by the large-angle light rays of the focusing beam. Therefore, the use of the conventional low-index-contrast GRIN lens or the high-index-contrast GRIN lens with the conventional parabolic profile for optical coupling do not lead to a good coupling efficiency between an optical fiber and a nanophotonic waveguide due to the above-mentioned issues.

While photonic integrated circuits or photonic chips have been under fast development, benefiting from the fabrication techniques developed in the micro-electronics industry, the above-mentioned optical coupling problems present a barrier in engineering and commercialization of the photonic chips.

In order to achieve a high coupling efficiency between a nanophotonic waveguide and an optical fiber, various coupling schemes have been proposed and demonstrated numerically or experimentally in the prior art. These include using an inverse taper, a grating structure, and/or a bi-level mode converter. While these proposed structures may improve the coupling efficiency, specific requirements are required in order to achieve the necessary coupling efficiency. For example, the coupling scheme using an inverse tapered nanophotonic waveguide requires a thick buried oxide layer, while the approach using the grating structure requires a vertical or a tilted fiber-alignment.

SUMMARY

According to an embodiment, a lens comprising a refractive index profile configured such that rays of light propagating in the lens form an at least substantially plane wavefront at an at least substantially vertical plane of the lens is provided. The refractive index profile may be configured to vary in an at least substantially bell curve shape along a radial direction of the lens.

According to an embodiment, a photonic package is provided. The photonic package may include: a lens; and a waveguide coupled to the lens. The photonic package may further include an optical fiber coupled to the lens.

According to an embodiment, a method of generating a refractive index profile for a lens is provided. The method may include: dividing the lens into a plurality of layers, wherein a thickness of each layer of the plurality of layers is at least substantially same; and determining a refractive index of each layer of the plurality of layers, from a layer comprising a maximum refractive index to a layer comprising a minimum refractive index. The method may further include approximating an input light as a point source, such that rays of light from the point source form an at least substantially plane wavefront at a focusing length of the lens.

According to an embodiment, a method of forming a lens comprising a refractive index profile is provided. The method may include: forming a plurality of layers configured to generate the refractive index profile along a radial direction of the lens, and wherein forming the plurality of layers comprises forming at least a first film and at least a second film arranged one above the other for each layer of the plurality of layers.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1A:
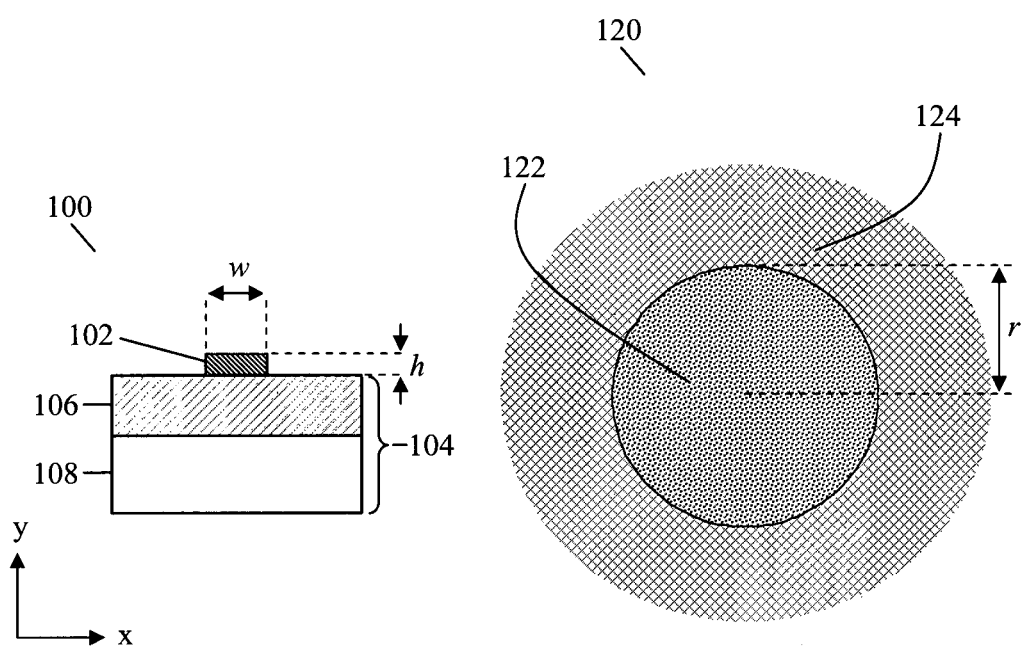
FIG. 1A shows schematic cross-sectional views of a silicon nanophotonic waveguide and a single mode optical fiber of the prior art.
Figure 1B:
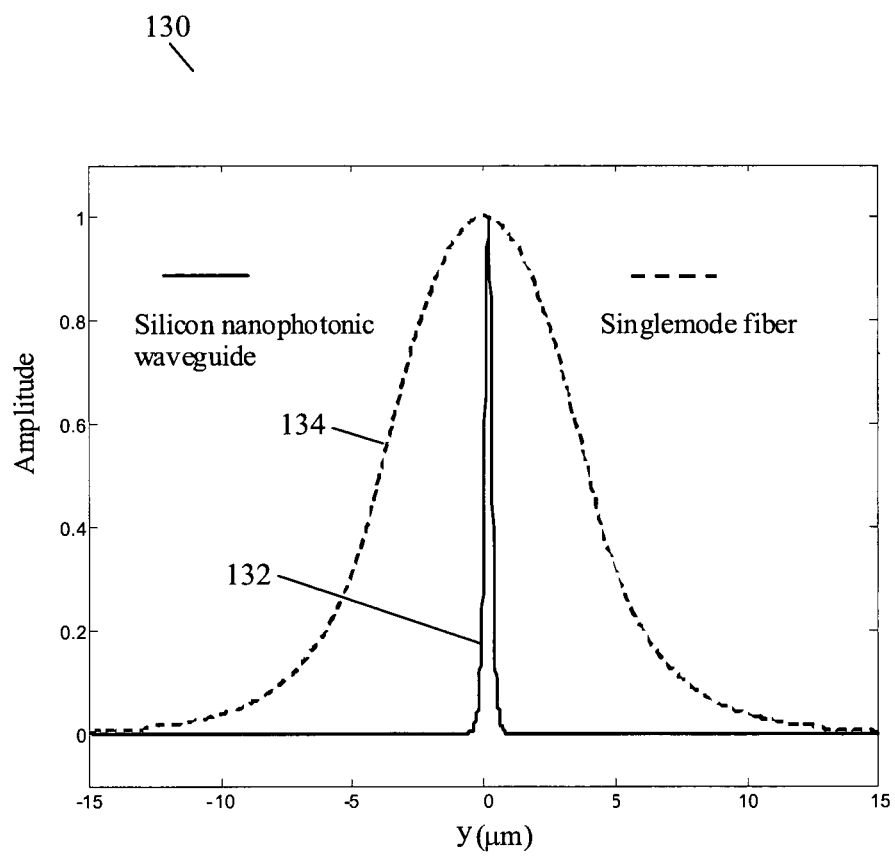
FIG. 1B shows a plot of the respective mode field profiles of the silicon nanophotonic waveguide and the single mode optical fiber of the embodiment of FIG. 1A.
Figure 2:
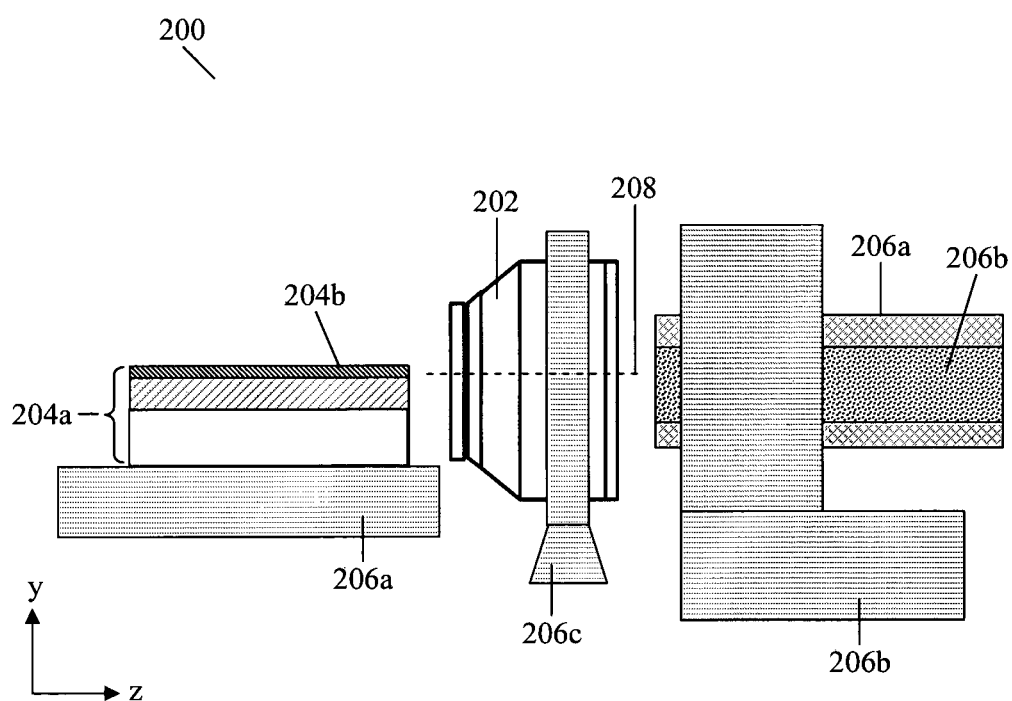
FIG. 2 shows a schematic side view of a coupling arrangement using an objective lens between a waveguide and a single mode optical fiber of the prior art.
Figure 3:
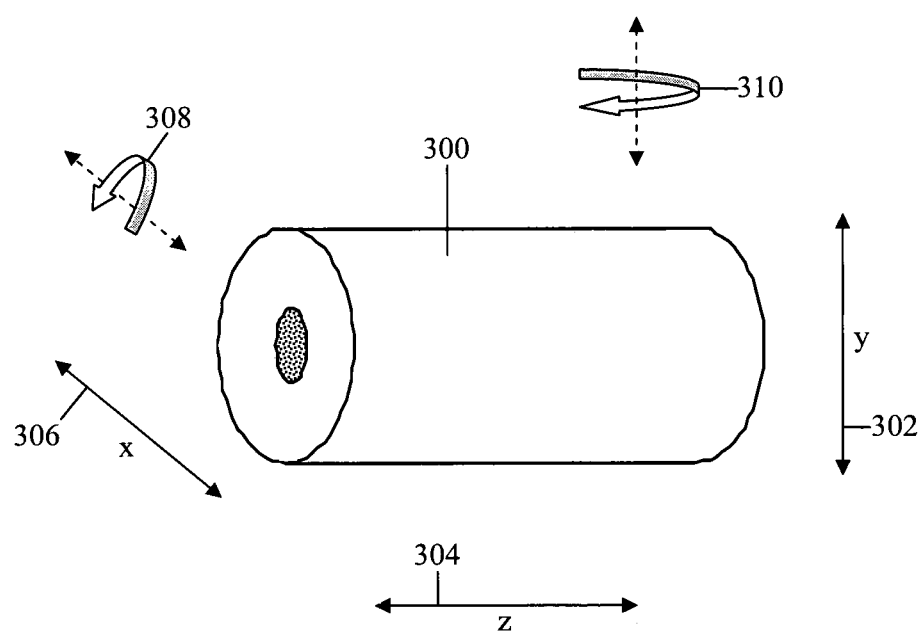
FIG. 3 shows a schematic view of an optical fiber of the prior art, illustrating a five-axis adjustment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Various embodiments relate to the field of integrated photonics, and in particular relate to coupling light between a photonic chip and an optical fiber for photonic chip interconnection. Various embodiments may provide a super-high numerical aperture (NA) and an ultra-compact integrated gradient-index (GRIN) lens with aberration-free focusing for photonic chip interconnection.

Various embodiments may provide a lens including a refractive index profile configured to vary in an at least substantially bell curve shape along a radial direction of the lens, wherein the refractive index profile comprises a maximum refractive index and at least one minimum refractive index.

Various embodiments may provide a lens and a method of forming the lens. Various embodiments may provide a photonic package including a lens and a waveguide coupled to the lens. Various embodiments may include at least one photonic chip or photonic integrated circuit. Various embodiments may provide a photonic chip or a photonic integrated circuit including at least one lens. Various embodiments may provide at least one lens integrated with a waveguide. In various embodiments, the at least one lens may include aberration-free lens. Various embodiments may provide a use of a lens of various embodiments for optical coupling. In various embodiments, the lens of various embodiments may be used for optical coupling between a waveguide and an optical fiber.

In various embodiments, one or more photonic chips may be provided, such that one photonic chip, two photonic chips, three photonic chips or any number of photonic chips may be provided. In various embodiments, one or more lens may be provided, such that one lens, two lenses, three lenses or any number of photonic lenses may be provided. In various embodiments, the one or more lens may include aberration-free lens and/or lens with a high numerical aperture. In various embodiments, one or more waveguides may be provided, such that one waveguide, two waveguides, three waveguides or any number of waveguides may be provided.

Various embodiments may provide a lens that may perform beam expansion or beam focusing for light beams with a sub-wavelength spot size. Various embodiments may further provide a substantially precise coupling scheme without or with reduced at least some of the associated disadvantages of conventional coupling arrangements or assemblies.

Various embodiments may provide a lens and a method of making the lens. In various embodiments, the lens may be an aberration-free lens. Various embodiments of the lens may include a symmetric GRIN lens and an asymmetric GRIN lens. In various embodiments, the GRIN lens may be a super-high numerical aperture GRIN lens.

In various embodiments, the symmetric GRIN lens or the aberration-free symmetric GRIN lens may have a symmetric refractive index profile. In various embodiments, the asymmetric GRIN lens or the aberration-free asymmetric GRIN lens may have an asymmetric refractive index profile. In various embodiments, the symmetric refractive index profile or the asymmetric refractive index profile is provided along a radial direction of the lens. Therefore, the refractive index of the lens varies or changes along the radial direction of the lens. In various embodiments, the radial direction of the lens is along the direction of the depth or thickness of the lens.

Various embodiments may provide a micro graded-refractive-index lens or a micro gradient-index lens with a super-high numerical aperture and aberration-free focusing that is highly compact (for example having dimensions of tens of micron long) and can be directly integrated, for example, with photonic chips or photonic integrated circuits. In various embodiments, the micro graded-refractive-index lens may be an optical thin-film stack-based micro graded-refractive-index lens. Various embodiments may provide a nanophotonic chip coupling using the optical thin-film stack-based micro graded-refractive-index lens.

Various embodiments may provide a lens or a GRIN lens including a refractive index profile configured such that rays of light propagating in or through the GRIN lens form an at least substantially plane wavefront at an at least substantially vertical plane of the GRIN lens. Therefore, the rays may be collimated and may be at an at least substantially horizontal propagating direction so as to be parallel to each other at this vertical plane of the GRIN lens. In various embodiments, the rays may be horizontally oriented and at least substantially parallel to each other after propagating a distance equivalent to the focusing length of the GRIN lens. In other words, the at least substantially vertical plane of the GRIN lens, where the rays form an at least substantially plane wavefront, is located at least substantially at the focusing length of the GRIN lens. In various embodiments, this vertical plane may be within the GRIN lens and/or may be at a facet of the GRIN lens. In various embodiments, the rays may form an at least substantially plane wavefront at a number of vertical planes of the GRIN lens. In various embodiments, the refractive index profile may be configured to vary in an at least substantially bell curve shape along a radial direction of the lens.

In the context of various embodiments, the terms "GRIN lens" and "Super-GRIN lens" may be used interchangeably to refer to the lens of various embodiments. In various embodiments, the GRIN lens or the Super-GRIN lens may have a high numerical aperture (NA) and may be aberration-free such that light propagating through the lens may converge into a single point at a focus point.

In the context of various embodiments, a symmetric GRIN lens may mean a GRIN lens with a symmetric refractive index profile while an asymmetric GRIN lens may mean a GRIN lens with an asymmetric refractive index profile.

In the context of various embodiments, the term "bell curve" may mean a curve that resembles an outline of a bell. The bell curve has a maximum point (ie. a peak, or the top of the bell), where the curve then slopes downward from the maximum point. The term "bell curve" may include a symmetrical curve (eg. resembling the outline of a complete bell) or an asymmetrical curve (eg. resembling the outline of half a bell).

In the context of various embodiments, the term "radial direction" may mean a direction along the thickness or depth of the lens.

In various embodiments, a waveguide may include a waveguide core where a substantial portion of light propagates, and a waveguide cladding. The waveguide cladding may be configured to substantially surround the waveguide core.

In further embodiments, a waveguide may include a waveguide core substantially surrounded by air. In other words, the waveguide does not include a waveguide cladding such that the waveguide on its own is equivalent to the waveguide core for light propagation.

In various embodiments, the lens of various embodiments may include a plurality of layers configured to generate a refractive index profile of the lens. Each layer of the plurality of layers may include at least a first film and a second film. Therefore, the lens of various embodiments may be a thin-film stack.

In various embodiments, the plurality of layers may include between about 20 layers to about 1000 layers, for example about 20 layers to about 800 layers, about 20 layers to about 500 layers or about 20 layers to about 300 layers, such that the plurality of layers may be about 20 layers, about 100 layers, about 300 layers, about 500 layers, about 800 layers or about 1000 layers.

In various embodiments, each layer of the plurality of layers may have an at least substantially same thickness or a different thickness. In various embodiments, the thickness of each layer of the plurality of layers may be between about 100 nm to about 300 nm, for example about 100 nm to about 200 nm, about 100 nm to about 150 nm or about 150 nm to about 300 nm, such that each layer may have a thickness of about 100 nm, about 150 nm, about 200 nm or about 300 nm. In further embodiments, the thickness of each layer of the plurality of layers may be about 100 nm or less (ie. ≤100 nm), such that the thickness of each layer may be between about 20 nm to about 100 nm, about 20 nm to about 50 nm or about 50 nm to about 100 nm, such that each layer may have a thickness of about 20 nm, about 50 nm, about 80 nm or about 100 nm.

In various embodiments, the refractive index profile may be configured to vary from about 3.5 to about 1.45 along the radial direction of the lens, for example about 3.5 to about 1.6, about 3.5 to about 2.0, about 3.5 to about 2.4 or about 3.0 to about 1.6.

In various embodiments, the refractive index profile may include at least one minimum refractive index of between about 1.5 to about 3.5, for example about 1.5 to about 3.0, about 1.5 to about 2.5, about 1.5 to about 2.0, about 2.0 to about 3.5, or about 2.5 to about 3.5, such that the at least one minimum refractive index may be about 1.5, about 2.0, about 2.5, about 3.2 or about 3.5.

In various embodiments, the lens may be configured to have a numerical aperture (NA) of between about 1.5 to about 3.5, for example about 1.5 to about 3.0, about 1.5 to about 2.5, about 1.5 to about 2.0, about 2.0 to about 3.5, or about 2.5 to about 3.5, such that the numerical aperture may be about 1.5, about 2.0, about 2.5, about 3.2 or about 3.5. In further embodiments, the lens may be configured to have a numerical aperture (NA) of about 3.1 or more (ie. ≥3.1), such that the lens may have a numerical aperture of about 3.1, about 3.5, about 3.8 or about 4.0.

In various embodiments, a thickness of the lens may be between about 3 μm to about 16 μm, for example about 3 μm to about 12 μm, about 3 μm to about 10 μm, about 5 μm to about 12 μm, about 5 μm to about 10 μm, about 5 μm to about 8 μm or about 8 μm to about 16 μm, such that the thickness may be about 3 μm, about 5 μm, about 8 μm, about 10 μm, about 12 μm or about 16 μm. In further embodiments, a thickness of the lens may be about 15.6 μm.

In various embodiments, a length of the lens may be between about 10 μm to about 25 μm, for example about 10 μm to about 22 μm, about 10 μm to about 20 μm, about 16 μm to about 22 μm, about 16 μm to about 20 μm, or about 18 μm to about 25 μm, such that the length may be about 10 μm, about 12 μm, about 16 μm, about 18 μm, about 20 μm or about 25 μm.

In various embodiments, the lens may be configured to have a focus length of between about 10 μm to about 16 μm, for example about 10 μm to about 14 μm or about 12 μm to about 16 μm, such that the focus length may be about 10 μm, about 12 μm, about 14 μm or about 16 μm.

In order that the invention may be readily understood and put into practical effect, particular embodiments will now be described by way of examples and not limitations, and with reference to the figures.

Figure 4A:
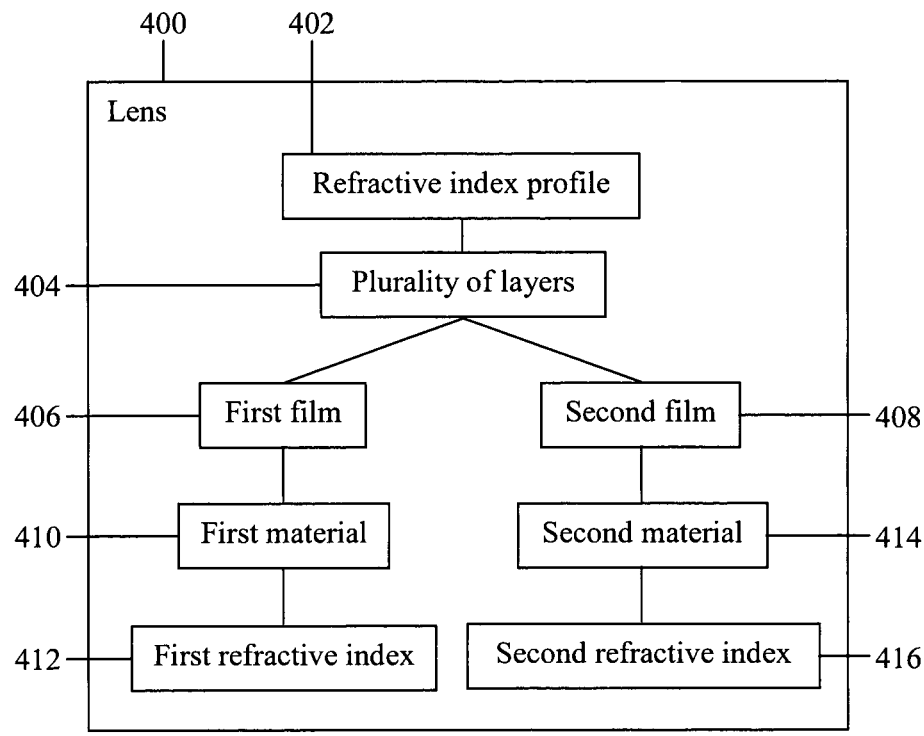
FIG. 4A shows a schematic block diagram of a lens, according to various embodiments.

FIG. 4A shows a schematic block diagram of a lens 400, according to various embodiments. The lens may have a refractive index profile 402 configured to vary in an at least substantially bell curve shape along a radial direction of the lens 400. In various embodiments, the lens 400 may include a plurality of layers 404 configured to generate the refractive index profile 402. Each layer of the plurality of layers 404 may include at least a first film 406 and a second film 408 arranged one above the other.

In various embodiments, the first film 406 may include a first material 410 having a first refractive index 412 and the second film 408 may include a second material 414 having a second refractive index 416, and wherein the first refractive index 412 is higher than the second refractive index 416.

In various embodiments, each layer of the plurality of layers 404 may include a plurality of the first films 406 and the second films 408, wherein the first films 406 and the second films 408 are arranged alternately.

In various embodiments, a thickness of the first films 406 and a thickness of the second films 408 of the plurality of layers 404 may be configured to change along the refractive index profile 402. In various embodiments the thickness of the first films 406 may decrease and the thickness of the second films 408 may increase, along the refractive index profile 402 from a maximum refractive index to an at least one minimum refractive index.

In various embodiments, the refractive index profile 402 may include a maximum refractive index, a first minimum refractive index and a second minimum refractive index, wherein the refractive index profile 402 may be configured to vary at least substantially symmetrically along the radial direction of the lens 400, such that the first minimum refractive index and the second minimum refractive index are arranged on opposite sides of the maximum refractive index along the radial direction of the lens 400. The maximum refractive index may be at an at least substantially central position along the radial direction of the lens 400.

In various embodiments, the refractive index profile 402 may include a maximum refractive index and a minimum refractive index, wherein the refractive index profile 402 is configured to vary asymmetrically along the radial direction of the lens 400, such that the minimum refractive index and the maximum refractive index are arranged along the radial direction of the lens 400.

Figure 4B:
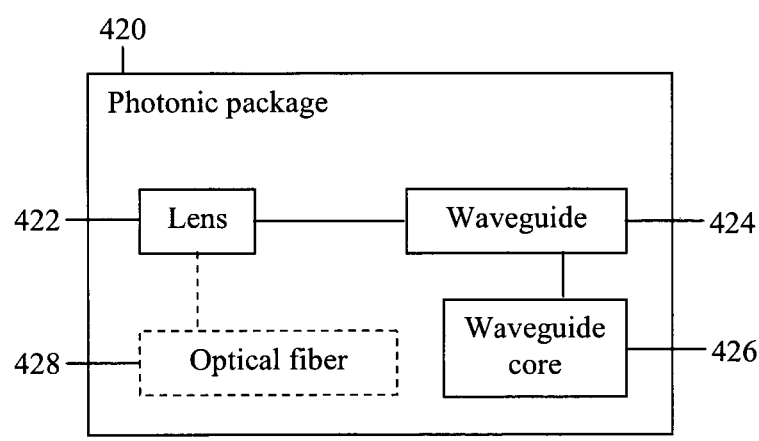
FIG. 4B shows a schematic block diagram of a photonic package, according to various embodiments.

FIG. 4B shows a schematic block diagram of a photonic package 420, according to various embodiments. The photonic package 420 may include a lens 422, for example the lens of various embodiments, and a waveguide 424 coupled to the lens 422. In various embodiments, the lens 422 may include a plurality of layers.

In various embodiments, the waveguide 424 may be configured to propagate a light with a sub-wavelength spot size, and wherein the lens 422 may be configured to expand the light from the waveguide 424 or focus the light into the waveguide 424.

In various embodiments, the lens 422 may be arranged adjacent to the waveguide 424, such that a first layer of a plurality of layers of the lens 422 may be configured to contact the waveguide 424. In various embodiments, the first layer of the plurality of layers of the lens 422 may have an at least substantially same refractive index as a waveguide core 426 of the waveguide 424. In various embodiments, the waveguide core 426 may have a refractive, index of about 3.5.

In various embodiments, the waveguide core 426 may have a thickness or a height of between about 300 nm to about 800 nm, for example about 300 nm to about 700 nm, about 300 nm to about 500 nm or about 500 nm to about 800 nm, such that the thickness of the waveguide core 426 may be about 300 nm, about 500 nm, about 700 nm or about 800 nm.

In various embodiments, the photonic package 420 may further include an optical fiber 428 coupled to the lens 422. In various embodiments, the lens 422 may be arranged in between the waveguide 424 and the optical fiber 428.

In various embodiments, the photonic package 420 may be a photonic chip or a photonic integrated circuit.

As an example and not limitations, the photonic package of various embodiments, for example the photonic package 420 of the embodiment of FIG. 4B, may be configured to employ wavelength-division multiplexing (WDM). In various embodiments, the photonic package 420 may be configured for use at a wavelength between about 1500 nm to about 1600 nm, for example between about 1500 nm to about 1580 nm, about 1500 nm to about 1560 nm or about 1540 nm to about 1600 nm, such as the wavelength may be about 1500 nm, about 1520 nm, about 1540 nm, about 1550 nm, about 1580 nm or about 1600 nm.

Figure 4C:
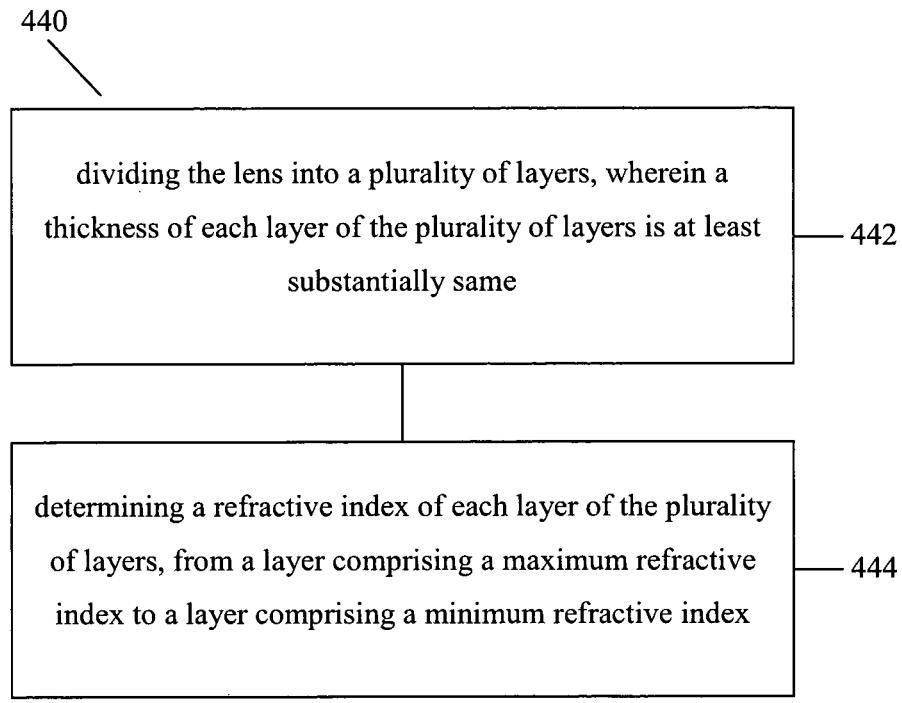
FIG. 4C shows a flow chart illustrating a method of generating a refractive index profile for a lens, according to various embodiments.

FIG. 4C shows a flow chart 440 illustrating a method of generating a refractive index profile for a lens, according to various embodiments.

At 442, the lens is divided into a plurality of layers, wherein a thickness of each layer of the plurality of layers is at least substantially same.

At 444, a refractive index of each layer of the plurality of layers is determined, from a layer comprising a maximum refractive index to a layer comprising a minimum refractive index.

Figure 4D:
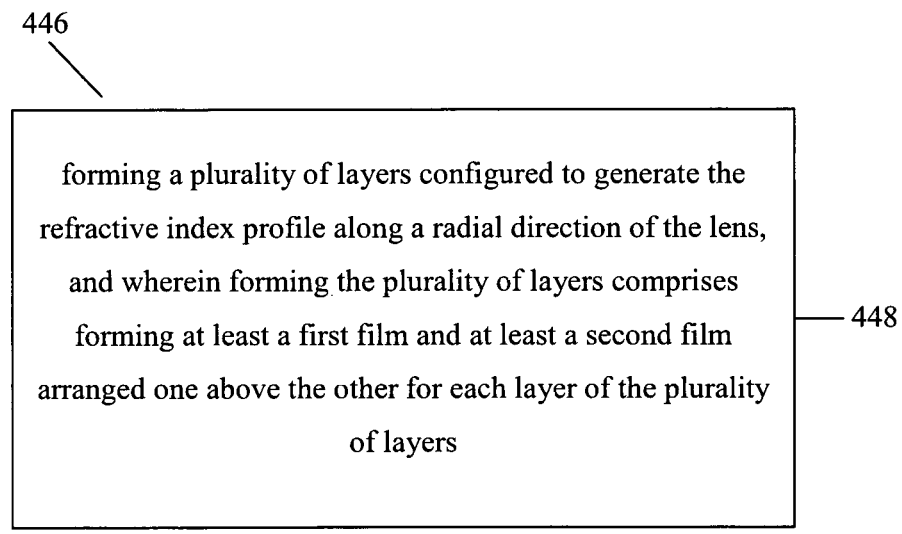
FIG. 4D shows a flow chart illustrating a method of forming a lens comprising a refractive index profile, according to various embodiments.

FIG. 4D shows a flow chart 446 illustrating a method of forming a lens comprising a refractive index profile, according to various embodiments.

At 448, a plurality of layers configured to generate the refractive index profile along a radial direction of the lens is formed, and wherein the plurality of layers is formed by forming at least a first film and at least a second film arranged one above the other for each layer of the plurality of layers.

In various embodiments, the first film includes a first material having a first refractive index and the second film includes a second material having a second refractive index, wherein the first refractive index is higher than the second refractive index.

In various embodiments, forming the plurality of layers may include a thin film deposition process.

Figure 5:
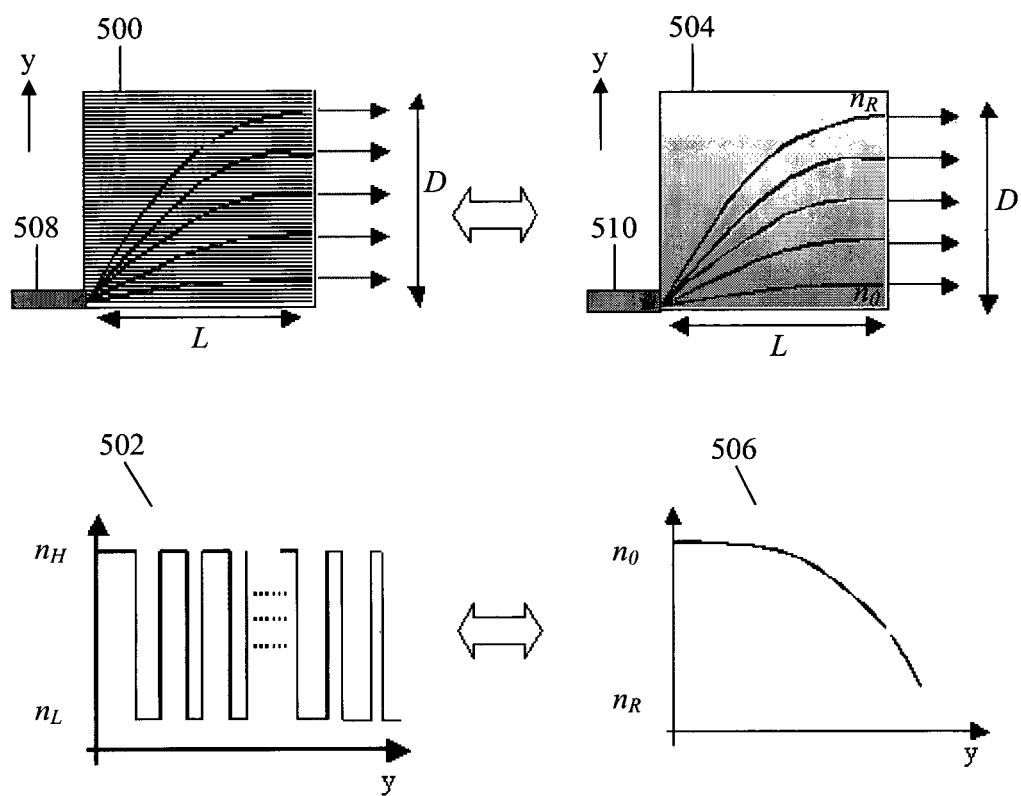
FIG. 5 shows schematic views of lenses of various embodiments, and their corresponding refractive index profiles.

Various embodiments may provide a lens and a method of forming the lens by depositing a stack or a plurality of layers. The plurality of layers may be a plurality of dielectric thin layers or films. FIG. 5 shows a schematic view of a lens 500 including a plurality of layers, and its corresponding refractive index profile 502. In various embodiments, the thickness of each layer may be at below one tenths of an optical wavelength in the material of the layer, in order to reduce or minimise scattering losses. For example, for a wavelength of approximately 1550 nm, the film thickness of each single layer is nanometer in dimensions and may be approximately below 100 nm, for a layer having a refractive index, n, of greater than 1.5 (ie. >1.5).

In various embodiments, using a dual-material approach, the lens 500 including a plurality of layers may include two alternating materials, for example alternating films of two materials, with different refractive indices, $n_H$ and $n_L$, as shown in the refractive index profile 502 to realize a GRIN profile. In various embodiments, the materials used may be silicon (Si) and silicon dioxide ($SiO_2$), where Si has a refractive index of about 3.5 (ie. $n_H$) and $SiO_2$ has a refractive index of about 1.5 (ie. $n_L$).

The lens 500 has a depth or thickness D and a length L. The depth D of the lens 500 along the y-axis is also the radial direction of the lens 500 such that the refractive index profile 502 varies along the radial direction of the lens 500.

In various embodiments, providing two materials having different refractive indices, $n_H$ and $n_L$, produces an effective refractive index, $n_{eff}$, which has a magnitude between $n_H$ and $n_L$, (ie. $n_H \geq n_{eff} \geq n_L$). Therefore, by varying the thicknesses of the films of the two different materials, any arbitratry effective refractive index may be achieved. Accordingly, lens 500 including a plurality of layers with two materials with different refractive indices, having the binary refractive index profile 502 may be provided to realize an equivalent asymmetric GRIN lens 504 with a graded refractive index profile 506, with an effective arbitrary refractive index variation from $n_0$ to $n_R$. In various embodiments, using the dual-material approach, the lens 500 and its equivalent asymmetric GRIN lens 504 may have a high numerical aperture (NA) and may be aberration-free, by tailoring the design and configuration of the lens 500.

The lens 504 has a depth or thickness D and a length L. The depth D of the lens 504 along the y-axis is also the radial direction of the lens 504 such that the refractive index profile 506 varies along the radial direction of the lens 504.

It should be appreciated that while FIG. 5 shows embodiments where the lens 500 is arranged on the side of the waveguide 508 and the lens 504 is arranged on the side of the waveguide 510, the lens 500 may also be arranged on top of the waveguide 508 and the lens 504 may also be arranged on top of the waveguide 510.

Further, it should be appreciated that while FIG. 5 and the corresponding descriptions refer to an asymmetric GRIN lens with an asymmetric refractive index profile, the descriptions may be similarly applicable to a symmetric GRIN lens with a symmetric refractive index profile. The symmetric GRIN lens may be equivalent to having the lens 500 together with a mirror image of the lens 500 arranged back-to-back, in the direction of the depth, D, of the lens 500. In other words, the symmetric GRIN lens includes the lens 500 as a top-half, and a mirror image of the lens 500 as a bottom-half, arranged back-to-back. The refractive indices (ie. the refractive index profile) of the bottom-half of the lens 500 may be determined based on symmetry, using the refractive indices (ie. the refractive index profile) of the top-half of the lens 500.

Figure 6:
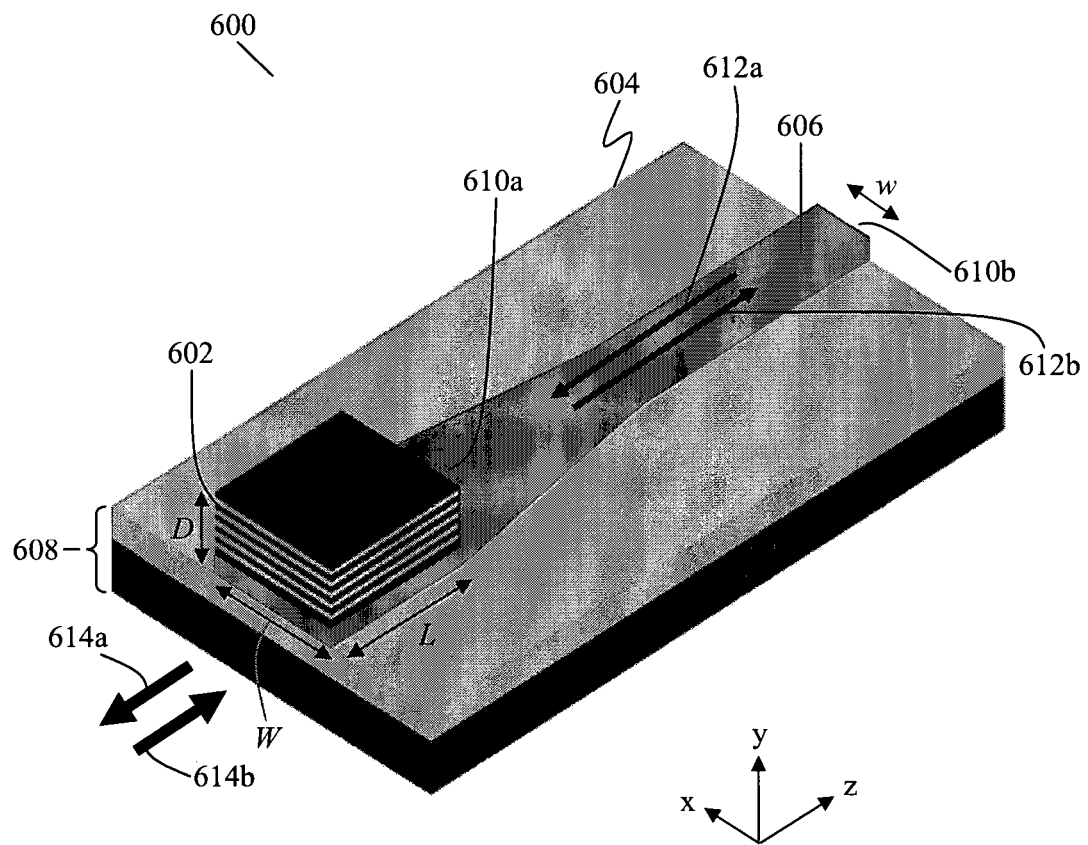
FIG. 6 shows a schematic perspective view of an optical thin-film based GRIN lens of various embodiments, for optical coupling between a nanophotonic chip and a fiber.

Various embodiments may provide a lens for optical coupling between a nanophotonic chip and a fiber (eg. an optical fiber). The lens may be an optical thin-film stack-based GRIN lens. The lens may include a plurality of layers. As an example and not limitations, FIG. 6 shows a schematic perspective view of a coupling arrangement 600 including an optical thin-film stack-based GRIN lens 602, for optical coupling between a nanophotonic chip 604 and a fiber (not shown). The nanophotonic chip 604 includes a nanophotonic waveguide 606 on a substrate 608, and the GRIN lens 602 is integrated on the nanophotonic waveguide substrate 608. In various embodiments, the GRIN lens 602 may be aberration-free. The GRIN lens 602 has a length, L, a width, W, and a depth or thickness, D. However, it should be appreciated that the lens 602 may be of any shapes, configurations and/or dimensions. The depth D of the lens 602 along the y-axis is also the radial direction of the lens 602.

In the embodiment shown in FIG. 6, the lens 602 is arranged adjacent to the waveguide 606, by being arranged on top of the waveguide 606, such that a first layer of the plurality of layers of the lens 602 is configured to contact the waveguide 606. In alternative embodiments, the lens 602 may be arranged adjacent to the waveguide 606 in a side to side configuration. In other words, the 602 may be arranged on the side of the waveguide 606. It should be appreciated that other arrangements of the lens 602 with respect to the waveguide 606 may be possible.

The nanophotonic waveguide 606 may have a linear tapered structure in the horizontal direction, along the z-direction, with the end 610a having a larger width compared to the end 610b. The end 610a may have a width that is at least substantially same as the width, W, of the lens 602, while the end 610b has a smaller width, w. However, it should be appreciated that the nanophotonic waveguide 606 may have other shapes or structures, such as various tapering shapes or a series of multimode waveguide sections.

In various embodiments, the length, L, of the lens 602, may be between about 50 μm to about 500 μm, for example about 50 μm to about 300 μm, about 50 μm to about 100 μm, about 200 μm to about 500 μm or about 300 μm to about 500 μm, such that L may be about 50 μm, about 100 μm, about 200 μm, about 300 μm, about 400 μm or about 500 μm.

In various embodiments, the width, W, of the lens 602, may be between about 5 μm to about 15 μm, for example about 5 μm to about 10 μm or about 10 μm to about 15 μm, such that W may be about 5 μm, about 8 μm, about 10 μm, about 12 μm or about 15 μm.

In various embodiments, the thickness, D, of the lens 602, may be between about 5 μm to about 15 μm, for example about 5 μm to about 10 μm or about 10 μm to about 15 μm, such that D may be about 5 μm, about 8 μm, about 10 μm, about 12 μm or about 15 μm.

In various embodiments, the width, w, of the waveguide end 610b, may be between about 0.4 μm to about 0.8 μm, for example about 0.4 μm to about 0.6 μm or about 0.6 μm to about 0.8 μm, such that w may be about 0.4 μm, about 0.6 μm or about 0.8 μm.

In various embodiments, the waveguide 606 may be configured to propagate a light with a sub-wavelength spot size. In various embodiments, the GRIN lens 602 may perform the functions of expanding the light beam with a sub-wavelength spot size from the waveguide 606 or focusing a light beam into a beam with a sub-wavelength spot size into the nanophotonic waveguide 606.

In various embodiments, a light beam, as represented by the arrow 612a, propagating along the waveguide 606, encounters the lens 602 integrated with the waveguide 606, which then expands the light beam. The light beam, as represented by the arrow 612a, may have a sub-wavelength spot size. The expanded light beam, as represented by the arrow 614a, may be coupled to an optical fiber (not shown).

In various embodiments, a light beam, as represented by the arrow 614b, for example from an optical fiber (not shown) encounters the lens 602 integrated with the waveguide 606, which then focuses the light beam. The focused light beam, as represented by the arrow 612b, then propagates along the waveguide 606. The light beam, as represented by the arrow 612b, may have a sub-wavelength spot size.

As shown in FIG. 6, the lens 602 is placed on a surface of the silicon nanophotonic waveguide 606, ie. on top of the waveguide 606. Such a vertically asymmetric configuration requires the lens 602 to have an asymmetric GRIN profile, for example similar to the refractive index profile 506 (FIG. 5), such that light may be focused into or expanded from the waveguide 606 by the lens 602 arranged on top of the waveguide 606.

In various embodiments, a lens may be provided for optical coupling between an optical fiber, for example having a mode-field diameter (MFD) of approximately 10.4 μm, and a nanophotonic waveguide, for example having a core with a thickness or height of approximately 300 nm (equivalent to a mode-field diameter (MFD) of approximately 380 nm at a wavelength of about 1550 nm). Therefore, coupling light from the optical fiber to the nanophotonic waveguide requires the light beam to be focused by over 25 times. Conversely, coupling light from the nanophotonic waveguide to the optical fiber requires the light beam to be expanded by over 25 times. Various embodiments may provide a lens with a compact size. A compact lens size advantageously enables ease of fabrication and saving of valuable real-estate space on the photonic chip. This may allow more components to be provided on the same photonic chip. In various embodiments, in order to achieve ultra-compact size for a lens, the lens may be configured so as to achieve this very high 25× transformation in the beam size within as short a propagation distance as possible. This in turns requires the lens to have a very short focusing length. Furthermore, in order to achieve the small focused spot size at the sub-wavelength for the nanophotonic waveguide, the GRIN lens of various embodiments has a high numerical aperture. The GRIN lens of various embodiments may have as high a numerical aperture as possible, depending on applications, to focus the light beams to even smaller or tighter spot sizes. As an example, for coupling a light beam into a silicon waveguide with a refractive index of about 3.5, a GRIN lens with a numerical aperture of 3.1 or more (ie. ≥3.1) may be required.

Various embodiments may provide a lens with a sufficiently high numerical aperture (NA) to collimate the light from a nanophotonic waveguide, based on "refractive lensing", for optical coupling, for example between a waveguide and an optical fiber. The lens of various embodiments may have a refractive index profile configured to vary in an at least substantially bell curve shape along a radial direction of the lens, wherein the refractive index profile comprises a maximum refractive index and at least one minimum refractive index. The lens is a GRIN lens and may be aberration-free and/or may achieve high coupling efficiency between the nanophotonic waveguide and the optical fiber. In contrast, a conventional GRIN lens with a parabolic GRIN profile (ie. a parabolic refractive infex profile) has severe aberration when the NA of the lens is high and consequently may not achieve good coupling efficiency between the nanophotonic waveguide and the optical fiber.

As an example and not limitations, the nanophotonic waveguide may have a refractive index contrast of approximately 3.5 and 1.5 between the waveguide core and the cladding. In other words, the waveguide core has a refractive index of about 3.5 and the cladding has a refractive index of about 1.5. By using a ray picture, the light beam from the waveguide may be represented as rays with different propagation angles, similar to that shown in FIG. 5. The angles spanned by the rays are given by the beam's divergence angle due to diffraction.

Figure 7:
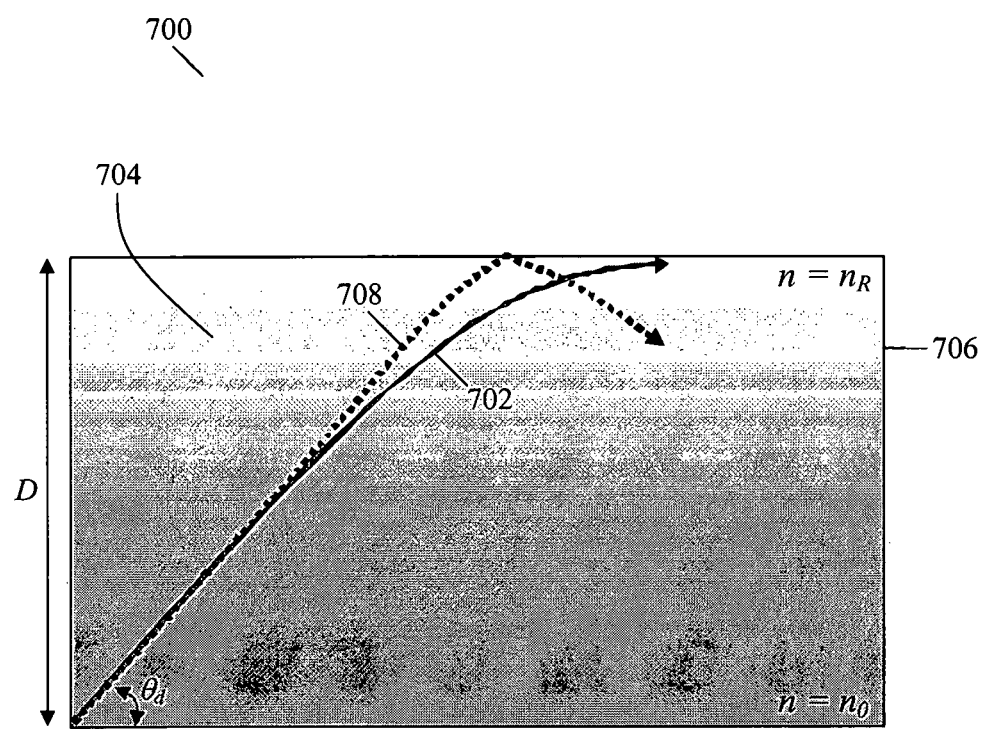
FIG. 7 shows a ray picture illustrating a ray propagating at the largest angle, $\theta_d$, in a lens, according to various embodiments.

FIG. 7 shows a ray picture 700 illustrating a ray 702 propagating at the largest angle, $\theta_d$, in a GRIN lens 704, according to various embodiments. The ray picture 700 may be used to illustrate the requirement of the refractive index contrast for collimating the light beam within the GRIN lens 704. In order to collimate the light beam with a sub-wavelength spot size in the GRIN lens 704 based on "refractive lensing", the ray 702 that propagates at the largest angle, $\theta_d$, has to bend around and become perpendicular to the facet 706 of the GRIN lens 704 (i.e. to become collimated) before coupling into an optical fiber (not shown). As shown in FIG. 7, the ray as represented by the dotted line 708, illustrates a ray that is not collimated or bent to become perpendicular to the facet 706.

Based on the ray picture 700 of FIG. 7, and Snell's law of refraction, the refractive index $n_R$ at the top of the GRIN lens 704 may be given by the equation:

$$n_R = n_0 \cos \theta_d \quad \text{(Equation 1)}$$

in order to bend the largest-angle ray 702 to collimate the ray 702.

The maximal emitting angle by the ray 702 or the angle $\theta_d$, may be determined using the refractive index contrast between $n_0$ and $n_R$, and is independent of the thickness, D, of the GRIN lens 704.

The NA of the GRIN lens 704 may be given by the equation:

$$NA = \sqrt{n_0^2 - n_R^2} \quad \text{(Equation 2)}.$$

Table 1 shows the beam's divergence angle $\theta_d$, defined as the half-angle that encompasses 95% of the beam energy, the required refractive index $n_R$ and the corresponding NA of a GRIN lens for different mode-field diameters (MFDs) or spot sizes of the waveguide mode at the wavelength of about 1550 nm under different thicknesses of the nanophotonic waveguide core (from about 800 nm to about 300 nm with a decrement of 100 nm). An MFD is defined as the beam diameter at $1/e^2$ of the beam intensity.

Table 1 shows that when the thickness of the waveguide is about 300 nm, corresponding to a single mode waveguide used in nanophotonic integration with a corresponding waveguide width of about 450 nm, the mode-field diameter is about 380 nm and the divergence angle is as large as 64° to encompass 95% of the beam energy. Table 1 also shows that when the MFD is decreased to about 380 nm, corresponding to a sub-wavelength spot size (as $\lambda/n=443$ nm, where $\lambda=1550$ nm and n=3.5 for the waveguide core), the required refractive index $n_R$ is about 1.53 and the corresponding NA of the GRIN lens is approximately 3.15.

TABLE 1

The required refractive index $n_R$ and NA for the GRIN lens to confine the light beam for different beam's MFDs with the corresponding divergence angle.

| Thickness of waveguide core (nm) | MFD of waveguide mode (nm) | Divergence angle, $\theta_d$ (°) | Refractive index $n_R$ | Required NA |
|---|---|---|---|---|
| 800 | 760 | 26 | 3.15 | 1.53 |
| 700 | 680 | 29 | 3.06 | 1.70 |
| 600 | 600 | 33 | 2.94 | 1.90 |
| 500 | 520 | 40 | 2.68 | 2.25 |
| 400 | 450 | 51 | 2.20 | 2.72 |
| 300 | 380 | 64 | 1.53 | 3.15 |

For comparison purposes, light propagation in a lens with an asymmetric parabolic GRIN profile with super-high NA is determined to illustrate that the lens suffers from severe aberration. As an example using a GRIN lens with the following design parameters: $n_0=3.5$, $n_R=1.5$, NA=3.16 and a thickness, D, of about 10 μm, light propagation in the parabolic asymmetric GRIN lens is determined using ray tracing as well as a full electromagnetic simulation using a finite-difference-time-domain (FDTD) method respectively.

Figure 8A:
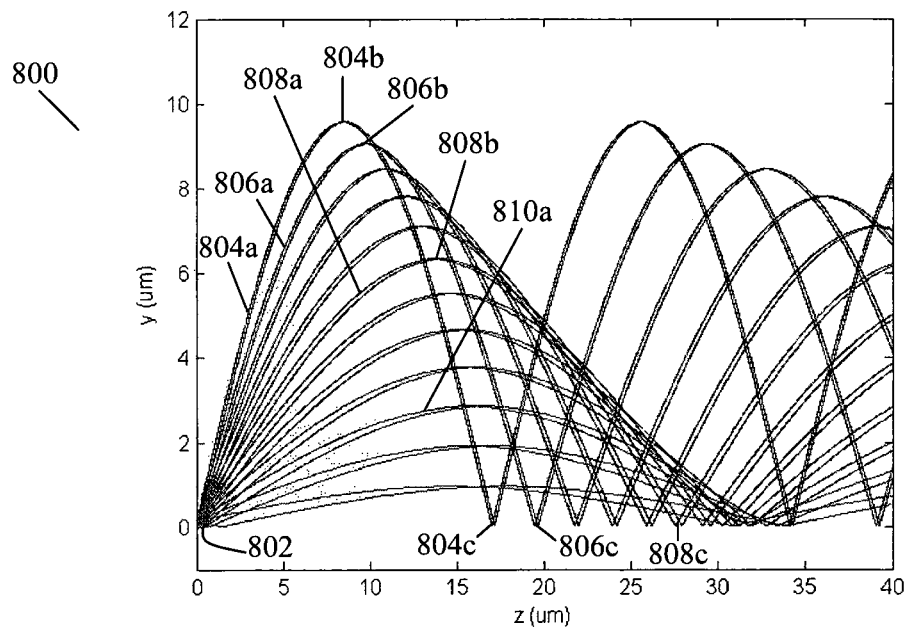
FIGS. 8A and 8B show simulation results of light propagation in a GRIN lens with a parabolic refractive index profile and a super-high NA based on ray-tracing and FDTD simulation of light propagation, respectively.
Figure 8B:
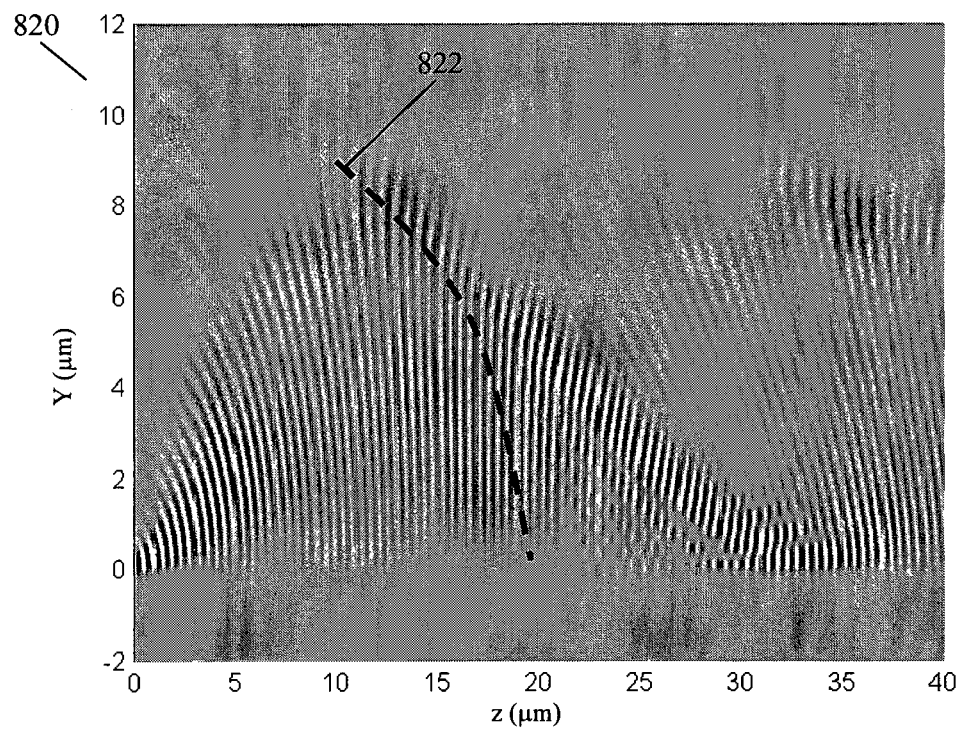

FIGS. 8A and 8B show simulation results 800, 820, of light propagation in a GRIN lens with a parabolic refractive index profile and a super-high NA based on ray-tracing and finite-difference time-domain (FDTD) simulation, respectively. The y-axis and the z-axis are similar to that illustrated in FIG. 6.

FIG. 8A shows the ray-tracing results 800 in the asymmetric GRIN lens, in which the rays originating from a point source 802, for example as represented by 804a, 806a, 808a, 810a, for four of the rays, are bent around or down from their respective peaks, in the GRIN lens due to the super-high NA. For example, the ray 804a with the largest angle has a corresponding peak 804b, while the ray 806a has the peak 806b and the ray 808a has the peak 808b. FIG. 8A shows the ray-tracing results 800 from about −60° to 60°, with a 5° step change. This means that the ray, as represented by 804a includes two rays with respectively emitting angles of −60° and 60°, the ray as represented by 806a includes two rays with respectively emitting angles of ±55°, the ray as represented by 808a includes two rays with respectively emitting angles of ±35° while the ray as represented by 810a includes two rays with respectively emitting angles of ±15°.

As shown in FIG. 8A, there is substantial spatial aberration of the focused spot of the respective rays. The large-angle rays have shorter focusing lengths and they do not focus (i.e. become collimated) at the same point as the small-angle rays. For example, the ray 804a with the largest angle has the shortest focusing length and the nearest focus point 804c, while the ray 806a has the focus point 806c and the ray 808a has the focus point 814c. In addition, the different focusing lengths make the paths of the different rays, for example as represented by 804a, 806a, 808a, 810a, for four of the rays, cross with each other after they are bent down from their respective peaks. In a corresponding wave picture, the rays, for example as represented by 804a, 806a, 808a, 810a, for four of the rays, form a "beam waist" with a plane wavefront at the facet of the lens and in the waveguide coupled to the lens.

In addition, as shown in FIG. 8A, some of the rays are not substantially tightly focused. For example, there is aberration at the focus point 808c of the ray 808a.

FIG. 8B shows the results 820 of the full electromagnetic simulation using the FDTD method in the GRIN lens. As shown in FIG. 8B, there is severe interference during propagation of light in the GRIN lens due to the different rays crossing with each other, as shown in the ray picture 800 of FIG. 8A.

In addition, the wavefront when the beam is expanded to near its maximum size does not become a vertical plane wavefront. This wavefront may be represented by the dotted curve line 822 in FIG. 8B and which may be superimposed on FIG. 8A to connect the respective peaks of the different rays. Generally, the location of the beam's maximum size is approximately at the lens facet or where the beam is coupled, for example, into an optical fiber. Hence, the aberration in the wavefront, as represented by the dotted curve line 822, results in poor coupling of the beam energy into the optical fiber.

Figure 9:
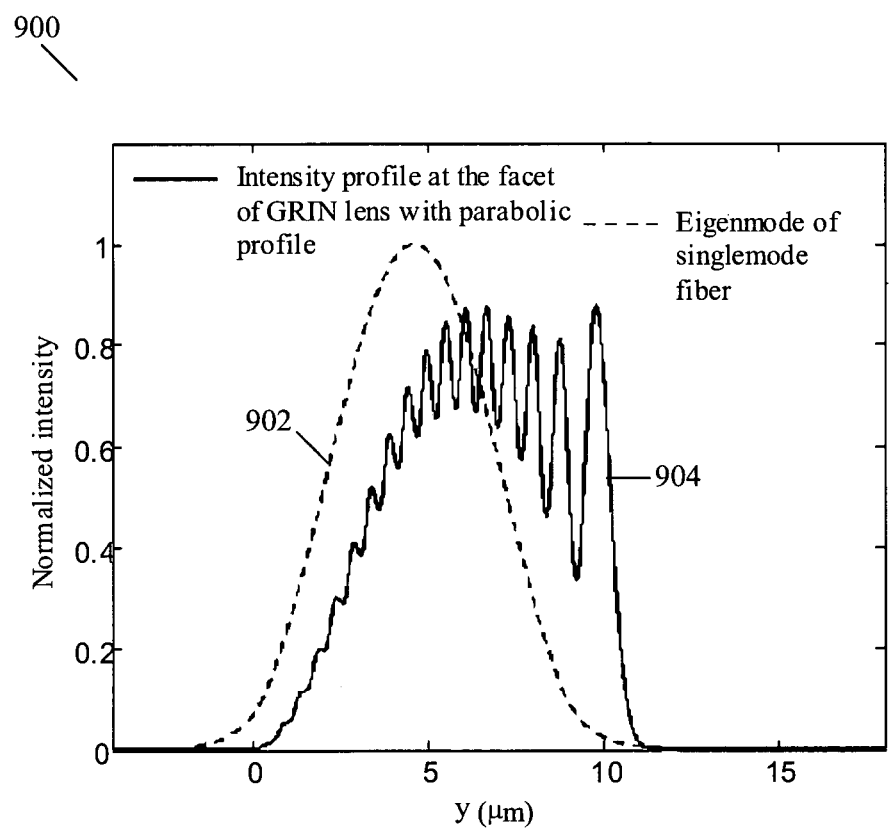
FIG. 9 shows a plot of normalized transverse intensity profiles of an eigenmode of a single mode fiber and an output field from a GRIN lens with a parabolic refractive index profile.

In order to use the asymmetric parabolic GRIN lens or the GRIN lens with an asymmetric parabolic refractive index profile for nanophotonic waveguide coupling, optimisation of the height D and length L of the GRIN lens and also the fiber position (center of the fiber core) $h_f$ from the bottom of the GRIN lens is required. Using a coupling arrangement between a standard singlemode fiber and a nanophotonic waveguide with a core thickness of approximately 300 nm as an example, and based on the parameter-space scanning approach, the maximal coupling efficiency may be achieved at the parameters D=15 μm, L=24.18 μm and $h_f$=5.3 μm. FIG. 9 shows a plot 900 of normalised transverse intensity profile 902 of an eigenmode of a single mode fiber and a normalised transverse intensity profile 904 of an output field at a facet of a GRIN lens with a parabolic refractive index profile, based on the optimised parameters, based on FDTD simulation. The severe ripples of the intensity profile 904 at the facet of the GRIN lens are caused by the interference of light while propagating within the GRIN lens, due to the non-ideal parabolic graded refractive index profile. In addition, as shown in FIG. 9, the two normalised transverse intensity profiles 902, 904, do not match each other. In other words, the two normalised transverse intensity profile 902, 904, are not substantially superimposed on each other. Accordingly, the maximal coupling efficiency from the nanophotonic waveguide to the optical fiber using this parabolic GRIN lens is approximately 66%.

Various embodiments may provide an aberration-free GRIN lens, a design method or algorithm (eg. a computational algorithm) for an aberration free GRIN profile (ie. a GRIN lens with a refractive index profile configured to provide an aberration-free GRIN lens) and applications of the aberration-free GRIN lens. Various embodiments may provide an efficient algorithm to computationally generate or provide a GRIN profile that may be completely or at least substantially aberration-free for focusing light beam, even at high numerical aperture (NA). The GRIN lens may be symmetric or asymmetric, depending on the applications of the GRIN lens. In various embodiments, rays emitted, for example, from a nanophotonic waveguide end, propagate within the aberration-free GRIN lens at different propagating angles. These rays propagating at different propagating angles may have an at least substantially same focusing length. Therefore, the GRIN lens may be arranged such that the rays may be at an at least substantially horizontal propagating direction or orientation when the rays reach a facet of an optical fiber coupled to the lens. The graded refractive index profile of various embodiments may have an at least substantially bell curve shape, differring from the conventional parabolic refractive index profile, and therefore may focus a light beam from an optical fiber to a sub-wavelength spot size into a nanophotonic waveguide without phase aberration for the focusing beam. In addition, by providing the graded refractive index profile of various embodiments, the coupling efficiency between the nanophotonic waveguide and the optical fiber may be improved or optimized to approximately 95%, in contrast to a coupling efficiency of approximately 66% for a GRIN lens with a parabolic refractive index profile.

Figure 10A:
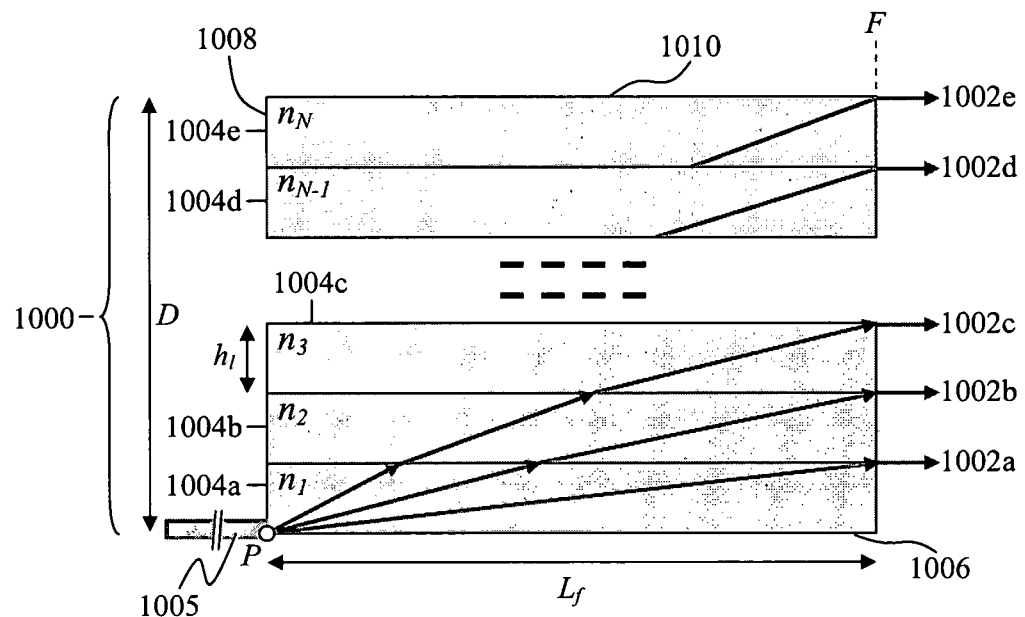
FIGS. 10A to 10C show trajectories of rays propagating in an aberration-free GRIN lens of various embodiments.
Figure 10B:
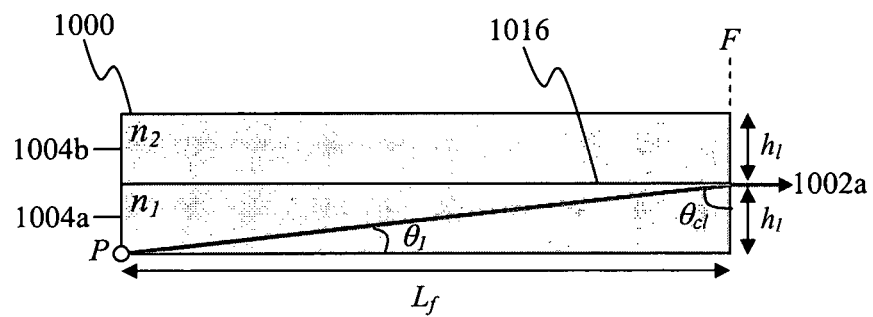
Figure 10C:
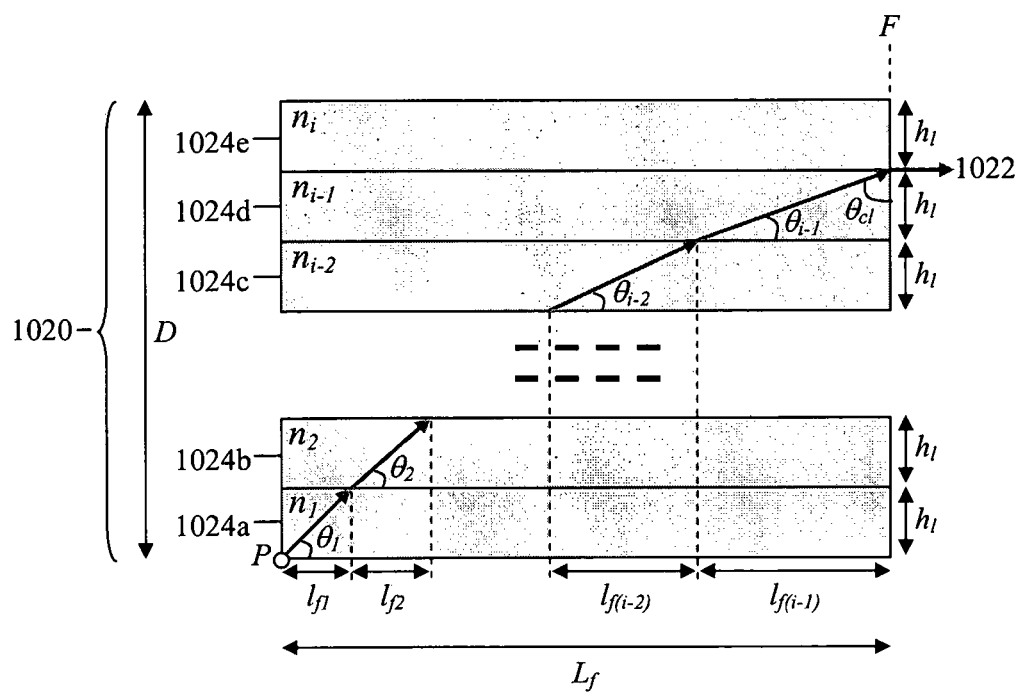

FIGS. 10A to 10C show trajectories of rays propagating in an aberration-free GRIN lens of various embodiments. As shown in FIGS. 10A to 10C, a graded refractive index profile is designed so that each ray emitting from a point source, P, may be collimated or be bent to be parallel at least substantially at the same lens facet, F, or exactly at the same lens facet, F. This may occur at the half distance of the so-called "beat length" for a GRIN lens. This half-distance of the beat length is hereinafter referred to as the focusing length, $L_f$. In various embodiments, the aberration-free GRIN lens may be either symmetric or asymmetric with respect to the refractive index profile. The refractive index profile may vary in a radial direction of the aberration-free GRIN lens.

In a design algorithm of an embodiment, the GRIN lens of various embodiments may first be divided into a plurality of layers, for example N layers, with each layer having a thickness, $h_l$ (where $h_l$=D/N, where D is the depth or thickness of the GRIN lens or the total thickness of the N layers) that is at least substantially constant or same. Then, a refractive index of each layer of the plurality of layers may be determined, beginning from a layer comprising a maximum refractive index to a layer comprising a minimum refractive index. For example, using an GRIN lens with an asymmetric refractive index profile as an example, the refractive index of a first layer, being the layer at the bottom surface of the lens and having the maximum refractive index, is determined. Subsequently, the refractive index of each successive layer from the first layer is determined, until the refractive index of the layer at the top surface of the lens, which is the layer having the minimum refractive index, has been determined. In addition, in the refractive index generation algorithm to determining the refractive index of each layer, the light source or input light may be regarded or approximated as a point source P, such that rays of light from the point source P may form an at least substantially plane wavefront at a focusing length, $L_f$, of the lens. The depth D of the lens 1000 is also the radial direction of the lens 1000.

FIG. 10A shows an aberration-free GRIN lens 1000 illustrating the trajectories of rays 1002a, 1002b, 1002c, 1002d, 1002e, that propagate in the GRIN lens 1000, originating from the input light source or point source, P. For illustration and clarity purposes, only five layers 1004a, 1004b, 1004c, 1004d, 1004e, of the N layers, with the corresponding five rays 1002a, 1002b, 1002c, 1002d, 1002e, are shown.

The point source, P, may be from a waveguide 1005 coupled to the GRIN lens 1000, which is arranged adjacent to the GRIN lens 1000, on the side 1008 of the GRIN lens 1000 near the bottom of the GRIN lens 1000. Therefore, the input light source, P, may be a light beam from the waveguide 1005 for coupling light between the GRIN lens 1000 and the waveguide 1005. The waveguide 1005 may be in contact with the GRIN lens 1000, such that the first layer 1004a of the plurality of N layers of the GRIN lens 1000 is configured to contact the waveguide 1005. The waveguide 1005 may have a sub-wavelength spot size such that the light beam from the waveguide 1005 may have a sub-wavelength spot size. In alternative embodiments, the waveguide 1005 coupled to the GRIN lens 1000, may be arranged adjacent to the GRIN lens 1000 at the bottom surface 1006 of the GRIN lens 1000 (eg. similar to the arrangement in the embodiment of FIG. 6).

The GRIN lens 1000 includes N layers, for example including 3 layers of a first layer 1004a, a second layer 1004b and a third layer 1004c at the bottom of the GRIN lens 1000, and two layers of an (N−1)-th layer 1004d and an N-th layer 1004e at the top of the GRIN lens 1000.

Each layer, for example 1004a, 1004b, 1004c, 1004d, 1004e, may be sufficiently thin so that the refractive index for each layer may be regarded as a constant, which may be denoted by $n_i$ (where i=1, 2, 3 . . . , N−1, N) for the i-th layer. As shown in FIG. 10A, the first layer 1004a has a refractive index of $n_1$, the second layer 1004b has a refractive index of $n_2$, the third layer 1004c has a refractive index of $n_3$, the (N−1)-th layer 1004d has a refractive index of $n_{N-1}$ and the N-th layer 1004e has a refractive index of $n_N$. In various embodiments, the GRIN profile or the refractive index profile of the GRIN lens 1000 has a gradually decreasing refractive index from the bottom of the GRIN lens 1000 to the top surface 1010 of the lens 1000, such that $n_i > n_{i+1}$ (ie. $n_1 > n_2 > n_3 > \ldots > n_{N-1} > n_N$). In other words, the refractive index of the respective layers of the GRIN lens 1000 decreases in the direction from the waveguide 1005 coupled to the GRIN lens 1000 or from the first layer 1004a to the N-th layer 1004e.

As shown in FIG. 10A, in various embodiments, the rays, for example 1002a, 1002b, 1002c, 1002d, 1002e, emitted or originating from P may be horizontally oriented and at least substantially parallel to each other after propagating a distance equivalent to the focusing length, $L_f$. In other words, the rays, for example 1002a, 1002b, 1002c, 1002d, 1002e, are at least substantially perpendicular to the lens facet F. Therefore, the rays, for example 1002a, 1002b, 1002c, 1002d, 1002e, may be horizontally oriented and at least substantially parallel to each other at least substantially at the lens facet, F. In various embodiments, the focusing length, $L_f$, of the GRIN lens 1000 may be of a dimension that is at least substantially same or different from the length of the GRIN lens 1000.

In various embodiments, in order to achieve at least substantially horizontal and parallel orientation of the rays, for example 1002a, 1002b, 1002c, 1002d, 1002e, after propagating through the focusing length, $L_f$, the refractive index $n_1$ of the first layer 1004a of the GRIN lens 1000 is configured to be at least substantially same or equal to the refractive index of the core (not shown) of the waveguide 1005 (ie. the refractive index of the material medium of the waveguide core containing the light source P) coupled to the GRIN lens 1000. In addition, providing at least substantially matching refractive indices between the core of the waveguide 1005 and the first layer 1004a minimises the optical reflection between the GRIN lens 1000 and the medium of the waveguide 1005 when light propagates between the waveguide 1005 and the GRIN lens 1000.

In various embodiments, a GRIN lens may be designed and provided after the refractive index, $n_i$, of each i-th layer of the N layers constituting the GRIN lens has been determined, and the thickness, $h_i$, of each i-th layer, may be made sufficiently and arbitrarily small to provide a substantially continuous refractive index profile for the GRIN lens.

FIG. 10B shows a partial schematic view of the embodiment of FIG. 10A, illustrating only the first layer 1004a and the second layer 1004b of the GRIN lens 1000, for illustration purposes. FIG. 10B shows the ray-tracing for determining the refractive index $n_2$ of the second layer 1004b. In various embodiments, when the refractive index $n_1$ for the first layer 1004a has been determined, the refractive index $n_2$ for the second layer 1004b, arranged above the first layer, may be determined, as shown in FIG. 10B, based on the requirement that the ray 1002a be at least substantially horizontally oriented at the distance $L_f$ from P. Therefore, the incident angle of the ray 1002a when travelling from the first layer 1004a with the refractive index $n_1$ to the second layer 1004b with the refractive index $n_2$ is at a critical angle $\theta_{c1}$ for the arrangement of the first layer 1004a and the second layer 1004b.

In the field of optics, when light crosses a boundary between materials with different refractive indices, the light beam will be partially refracted at the boundary surface, and partially reflected. A critical angle, as known in the field of optics, refers to the angle of incidence of a light beam traversing between the boundary such that the angle of refraction of the light beam is 90°. In other words, a light beam incident at the critical angle on the boundary between materials with different refractive indices subsequently travels along the boundary. An angle of incidence greater than the critical angle results in total internal reflection of the light beam, such that a light beam incident at an incident angle greater than the critical angle on a boundary between materials with different refractive indices is subsequently reflected at the boundary surface.

Accordingly, the propagating angle $\theta_1$ for the ray 1002a in the first layer 1004a with $n_1$ may be given by the equation:

$$\theta_1 = \frac{\pi}{2} - \theta_{c1} = \arccos\left(\frac{n_2}{n_1}\right) \quad \text{(Equation 3)}$$

such that the ray 1002a may be horizontally oriented at the boundary interface 1016 between the first layer 1004a with $n_1$ and the second layer 1004b with $n_2$.

Equation 3 is equivalent to the following equation, as determined from Snell's law at the critical angle $\theta_{c1}$:

$$n_1 \cos(\theta_1) = n_2 \cos(0) = n_2 \quad \text{(Equation 4),}$$

$$\text{where } \cos(\theta_1) = \sin(\theta_{c1}) \quad \text{(Equation 5).}$$

As shown in FIG. 10B, the focusing length, $L_f$, may be given by the equation:

$$L_f = \frac{h_i}{\tan(\theta_1)}. \quad \text{(Equation 6)}$$

Accordingly, by using equation 4 as determined from Snell's law at the critical angle $\theta_{c1}$, equation 6 and the following equations:

$$\tan(\theta_1) = \frac{\sin(\theta_1)}{\cos(\theta_1)}, \quad \text{(Equation 7)}$$

$$\sin(\theta_1) = \frac{h_i}{\sqrt{L_f^2 + h_i^2}}, \quad \text{(Equation 8)}$$

$n_2$ may be determined and may be given by the equation:

$$n_2 = \frac{L_f}{\sqrt{L_f^2 + h_i^2}} n_1. \quad \text{(Equation 9)}$$

Therefore, in various embodiments, the refractive index $n_i$ for the i-th layer may be similarly determined. FIG. 10C shows ray-tracing for determining the refractive index $n_i$ for the i-th layer.

FIG. 10C shows an aberration-free GRIN lens 1020 illustrating the trajectory of ray, 1022, originating from the input light source or point source, P, that propagate in the GRIN lens 1020. The point source, P, may be from a waveguide (not shown) coupled to the GRIN lens 1020, which may be arranged adjacent to the GRIN lens 1020 on the side or bottom of the GRIN lens 1020. The GRIN lens 1020 may include a plurality of layers, for example including 2 layers of a first layer 1024a and a second layer 1024b at the bottom of the GRIN lens 1020, and three layers of an (i−2)-th layer 1024c, an (i−1)-th layer 1024d and an i-th layer 1024e at the top of the GRIN lens 1020. For illustration and clarity purposes, only five layers 1024a, 1024b, 1024c, 1024d, 1024e, of the plurality of layers constituting the GRIN lens 1020 and a single ray 1022, are shown.

Each layer, for example 1024a, 1024b, 1024c, 1024d, 1024e, may be sufficiently thin, with a thickness of $h_l$ (where $h_l = D/N$, where D is the depth or thickness of the GRIN lens or the total thickness of the plurality of layers), such that the refractive index for each layer may be regarded as a constant. As shown in FIG. 10C, the first layer 1024a has a refractive index of $n_1$, the second layer 1024b has a refractive index of $n_2$, the (i−2)-th layer 1024c has a refractive index of $n_{i-2}$, the (i−1)-th layer 1024d has a refractive index of $n_{i-1}$ and the i-th layer 1024e has a refractive index of $n_i$. In various embodiments, the refractive index profile of the GRIN lens 1020 has a varying refractive index profile such that $n_1 > n_2 > \ldots > n_{i-2} > n_{i-1} > n_i$.

As shown in FIG. 10C, in various embodiments, the ray 1022 emitted or originating from P may be horizontally oriented or in other words at least substantially perpendicular to the lens facet F after propagating a distance equivalent to the focusing length, $L_f$.

It should be appreciated that descriptions with respect to the embodiments of FIGS. 10A and 10B may similarly be applicable to the embodiment of FIG. 10C.

Based on FIG. 10C, the incident angle of the ray 1022 when travelling from the (i−1)-th layer 1024d with the refractive index $n_{i-1}$ to the i-th layer 1024e with the refractive index n, is at a critical angle $\theta_{cl}$.

In various embodiments, by considering the following relationship or equation as determined based on Snell's Law $$n_1 \cos \theta_1 = n_2 \cos \theta_2 = \ldots = n_i \qquad \text{(Equation 10)},$$

and therefore $$\theta_k = \arccos\left(\frac{n_i}{n_1}\right), \qquad \text{(Equation 11)}$$

where $k = 1, 2, \ldots, i-1$,
and the equations for the focus length, $L_f$ $$L_f = lf_1 + lf_2 + \ldots + lf_{i-2} + lf_{i-1} \qquad \text{(Equation 12)},$$

and correspondingly $$lf_1 = \frac{h_l}{\tan(\theta_1)} = \frac{h_l}{\sqrt{\left(\frac{n_1}{n_i}\right)^2 - 1}}, \qquad \text{(Equation 13)}$$

$$lf_2 = \frac{h_l}{\tan(\theta_2)} = \frac{h_l}{\sqrt{\left(\frac{n_2}{n_i}\right)^2 - 1}}, \qquad \text{(Equation 14)}$$

$$lf_{i-2} = \frac{h_l}{\tan(\theta_{i-2})} = \frac{h_l}{\sqrt{\left(\frac{n_{i-2}}{n_i}\right)^2 - 1}}, \qquad \text{(Equation 15)}$$

and $$lf_{i-1} = \frac{h_l}{\tan(\theta_{i-1})} = \frac{h_l}{\sqrt{\left(\frac{n_{i-1}}{n_i}\right)^2 - 1}}, \qquad \text{(Equation 16)}$$

the refractive index $n_i$ for the i-th layer of the plurality of layers may be determined by the equation:

$$L_f = \sum_{k=1}^{i-1} \frac{h_l}{\sqrt{\frac{n_k^2}{n_i^2} - 1}}. \qquad \text{(Equation 17)}$$

Therefore, by implementing the design algorithm of various embodiments, the refractive index profile of the GRIN lens of various embodiments may be generated layer by layer when the parameters for the lens, for example the depth or thickness of the lens D, the focusing length $L_f$ and the refractive index $n_i$ of the first layer, have been determined.

It should be appreciated that while FIGS. 10A to 10C and the corresponding descriptions refer to an asymmetric GRIN lens with an asymmetric refractive index profile, the descriptions may be similarly applicable to a symmetric GRIN lens with a symmetric refractive index profile. The symmetric GRIN lens may be equivalent to having the lens 1000 together with a mirror image of the lens 1000 arranged back to back, in the direction of the depth, D, of the lens 1000. In other words, the symmetric GRIN lens includes the lens 1000 as a top-half, and a mirror image of the lens 1000 as a bottom-half, arranged back to back. The refractive indices (ie. the refractive index profile) of the bottom-half of the lens 1000 may be determined based on symmetry, using the refractive indices (ie. the refractive index profile) of the top-half of the lens 1000.

Further, it should be appreciated that other design algorithms may be implemented to form the GRIN lens of various embodiments.

Various embodiments may provide an aberration-free symmetric Super-GRIN lens. In other words, the Super-GRIN lens or the GRIN lens is aberration-free and has a symmetric refractive index profile.

In various embodiments, a symmetric GRIN lens may be equivalent to having mirror images of a corresponding asymmetric GRIN lens (ie. two similar asymmetric GRIN lenses configured back-to-back). In other words, a symmetric GRIN lens with a particular symmetric refractive index profile may be equivalent to having an asymmetric GRIN lens with an asymmetric refractive index profile as one-half of the symmetric GRIN lens, and a mirror image of the asymmetric GRIN lens with the asymmetric refractive index profile as a second-half of the symmetric GRIN lens, arranged back to back. The asymmetric refractive index profile and its mirror image profile, making up the two halfs, may be equivalent to the symmetric refractive index profile of the symmetric GRIN lens. Accordingly, the symmetric refractive index profile of the symmetric GRIN lens may be determined by determining the refractive index profile of one-half of the symmetric GRIN lens and then determining the refractive index profile of the second-half of the symmetric GRIN lens based on symmetry (ie. providing a back-to-back mirror image of the refractive index profile of the one-half of the symmetric GRIN lens).

As an example and not limitations, a symmetric GRIN lens may be designed with the parameters of lens' depth of about 20 μm, focus length $L_f$ of about 10 μm and the number of layers of the GRIN lens of about 1000. The number of layers N of about 1000 has been determined to be sufficient through light propagation simulation. Accordingly, one-half of the symmetric GRIN lens has the parameters D, being half of the GRIN lens' thickness, of about 10 μm, $L_f$ of about 10 μM and N, being half the number of layers of the GRIN lens, of about 500.

Subsequently, the refractive index profile for one-half of the symmetric GRIN lens (ie. an asymmetric refractive index profile) may be determined based on Equation 17 for each layer of the GRIN lens, and the corresponding refractive index profile for the second-half of the symmetric GRIN lens may be then determined by symmetry.

Figure 11A:
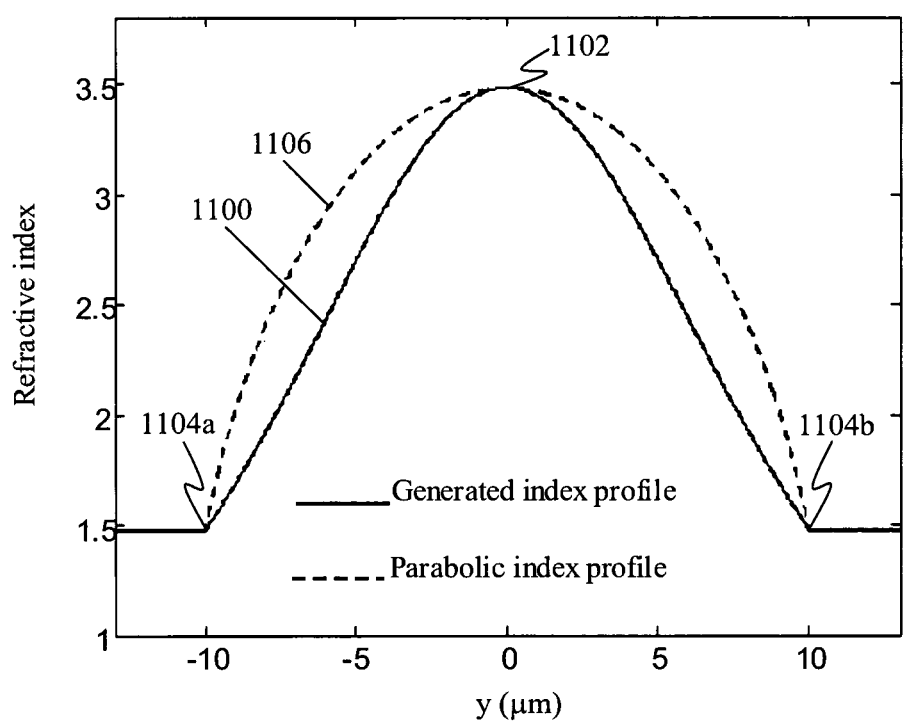
FIG. 11A shows a refractive index profile of a symmetric aberration-free GRIN lens, according to various embodiments.

FIG. 11A shows a refractive index profile 1100 of a symmetric aberration-free GRIN lens along a radial direction of the lens (as represented by the axis denoted with y (μm), with y=0 referring to the central position along the radial direction of the lens), according to various embodiments. The refractive index profile 1100 includes a maximum refractive index 1102, a first minimum refractive index 1104a and a second minimum refractive index 1104b, wherein the first minimum refractive index 1104a and the second minimum refractive index 1104b are arranged on opposite sides of the maximum refractive index 1102 along the radial direction of the lens. As shown in FIG. 11A, the refractive index profile 1100 varies at least substantially symmetrically along the radial direction of the lens. In addition, the maximum refractive index 1102 may be at an at least substantially central position (ie. at y=0) along the radial direction of the lens.

The refractive index profile 1100 varies between about 3.5 at the maximum refractive index 1102 and about 1.458 at the first minimum refractive index 1104a and the second minimum refractive index 1104b.

For comparison purposes, the refractive index distribution of a GRIN lens based on a parabolic refractive index profile 1106 with the same refractive index variation range is also shown in FIG. 11A. It can be seen that the refractive index profile 1100 of the symmetric GRIN lens of various embodiments distinctly differs from the conventional parabolic refractive index profile 1106.

Figure 11B:
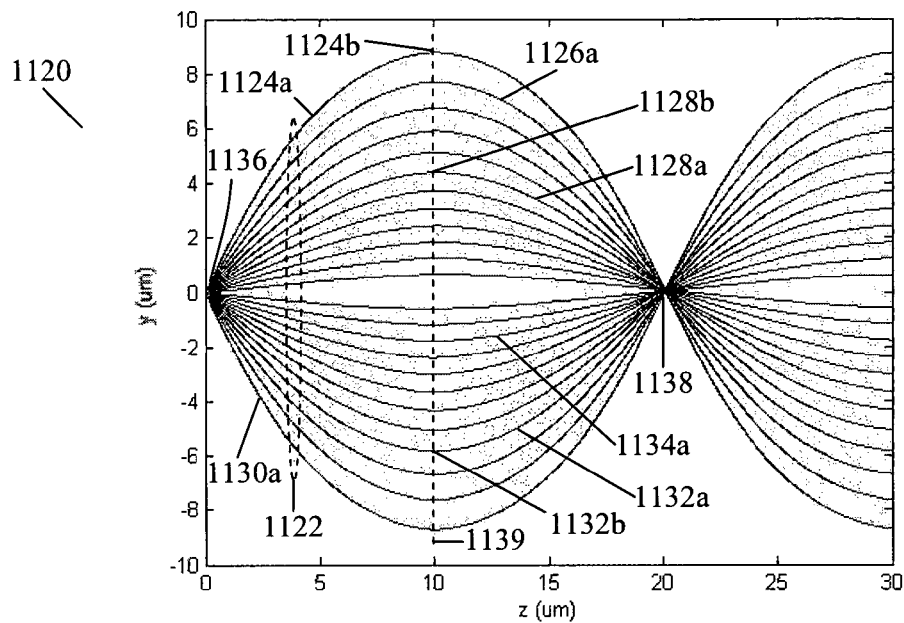
FIGS. 11B and 11C show simulation results of light propagation in a symmetric aberration-free GRIN lens of various embodiments, based on ray-tracing and FDTD simulation of light propagation, respectively.
Figure 11C:
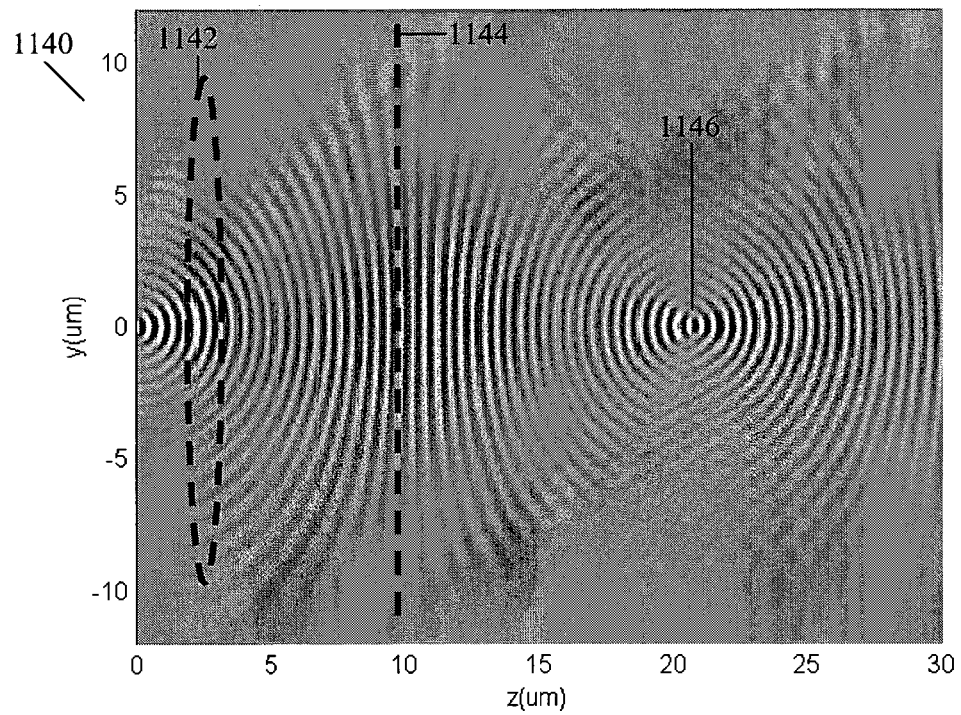

FIGS. 11B and 11C show simulation results 1120, 1140, of light propagation in a symmetric aberration-free GRIN lens having the refractive index profile 1100 of FIG. 11A, based on ray-tracing and FDTD simulation of light propagation, respectively.

FIG. 11B shows the ray-tracing results 1120 in the symmetric GRIN lens, in which a light beam 1122 including the rays, for example as represented by 1124a, 1126a, 1128a, 1130a, 1132a, 1134a, for six of the rays, originating from a point source 1136, are bent around or down from their respective peaks, in the GRIN lens due to the super-high NA of the GRIN lens to a single focus point 1138 (ie. the rays propagating in the GRIN lens converge to the same focus point 1138). Therefore, the symmetric GRIN lens of various embodiments provide aberration-free focusing. In addition, the different rays do not cross with each other during propagation in the symmetric GRIN lens of various embodiments. In comparison, a conventional GRIN lens with a parabolic refractive index profile experiences aberration, as shown in the ray tracing 800 of FIG. 8A.

As shown in FIG. 11B, the ray 1124a has a corresponding peak 1124b, while the ray 1128a has the peak 1128b and the ray 1132a has the peak 1132b. The dotted line 1139 is illustrated in FIG. 11B for the purpose of denoting the respective peaks of the respective rays propagating in the GRIN lens (ie. the dotted line 1139 represents the position where the beam 1122 is expanded to near its maximum size). The at least substantially vertical dotted line 1139 also shows that the respective peaks of the respective rays propagating in the GRIN lens, lie on an at least substantially vertical plane. In addition, as shown in FIG. 11B, the rays, for example as represented by 1124a, 1126a, 1128a, 1130a, 1132a, 1134a, for six of the rays, are at least substantially collimated and at least substantially parallel to each other, such that the rays, for example as represented by 1124a, 1126a, 1128a, 1130a, 1132a, 1134a, for six of the rays, form an at least substantially plane wavefront at an at least substantially vertical plane, for example as represented by the dotted line 1139, of the GRIN lens.

FIG. 11C shows the results 1140 of the full electromagnetic simulation using the FDTD method in the symmetric GRIN lens of various embodiments. As shown in FIG. 11C, the input light beam 1142 is expanded to near its maximum size, at the position represented by the dotted line 1144, and then focused to a focus point 1146. Furthermore, there is no observable interference during propagation of light in the symmetric GRIN lens as the different rays, as shown in the ray picture 1120 of FIG. 11B, do not cross with each other.

In addition, the wavefront, as represented by the dotted line 1144, when the beam is expanded to near its maximum size, is an at least substantially vertical plane wavefront. This wavefront, as represented by the dotted line 1144, may be superimposed with the dotted line 1139 of FIG. 11B connecting the respective peaks of the different rays. The wavefront, as represented by the dotted line 1144, is generally approximately at the lens facet or where the light beam is coupled, for example, into an optical fiber. Hence, the substantially vertical wavefront, with minimal or no aberration, results in good coupling of the beam energy into the optical fiber. In comparison, a conventional GRIN lens with a parabolic refractive index profile experiences a curved wavefront, as represented by the curved line 822 and interference, as shown in the FDTD results 820 of FIG. 8B, thereby leading to poor optical coupling.

Various embodiments may provide an aberration-free asymmetric Super-GRIN lens. In other words, the Super-GRIN lens or the GRIN lens is aberration-free and has an asymmetric refractive index profile.

As an example and not limitations, an asymmetric GRIN lens may be designed with the parameters of lens' depth D of about 10 μm, focus length $L_f$ of about 10 μm and the number of layers of the GRIN lens of about 1000. The number of layers N of about 1000 has been determined to be sufficient through light propagation simulation.

Subsequently, the refractive index profile for the asymmetric GRIN lens (ie. an asymmetric refractive index profile) may be determined based on Equation 17 for each layer of the GRIN lens.

Figure 12A:
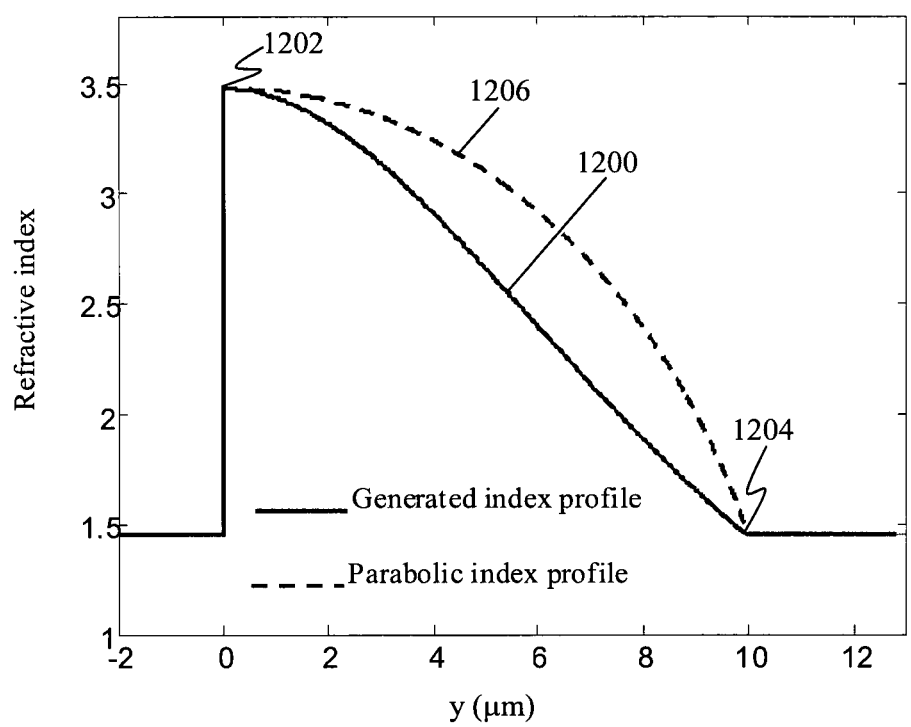
FIG. 12A shows a refractive index profile of an asymmetric aberration-free GRIN lens, according to various embodiments.

FIG. 12A shows a refractive index profile 1200 of an asymmetric aberration-free GRIN lens along a radial direction of the lens (as represented by the axis denoted with y (μm) with y=0 referring to the bottom surface of the lens), according to various embodiments. The refractive index profile 1200 includes a maximum refractive index 1202 and a minimum refractive index 1204, wherein the minimum refractive index

1204 and the maximum refractive index 1202 are arranged along the radial direction of the lens. As shown in FIG. 12A, the refractive index profile 1200 varies asymmetrically along the radial direction of the lens. In addition, the maximum refractive index 1202 may be located near the bottom surface of the lens. The refractive index profile 1200 varies between about 3.5 at the maximum refractive index 1202 and about 1.458 at the minimum refractive index 1204.

For comparison purposes, the refractive index distribution of a GRIN lens based on a parabolic refractive index profile 1206 with the same refractive index variation range is also shown in FIG. 12A. It can be seen that the refractive index profile 1200 of the asymmetric GRIN lens of various embodiments distinctly differs from the conventional parabolic refractive index profile 1206.

Figure 12B:
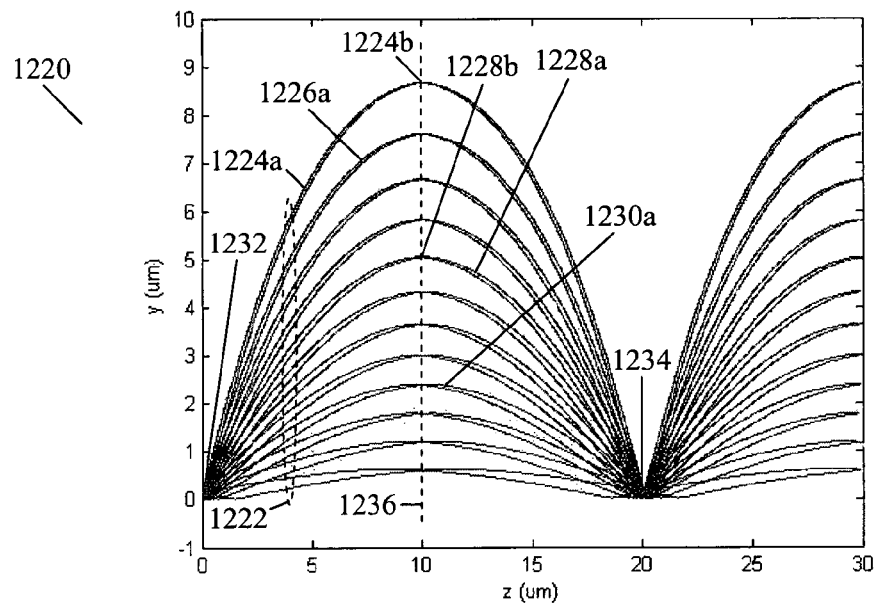
FIGS. 12B and 12C show simulation results of light propagation in an asymmetric aberration-free GRIN lens of various embodiments based on ray-tracing and FDTD simulation of light propagation, respectively.
Figure 12C:
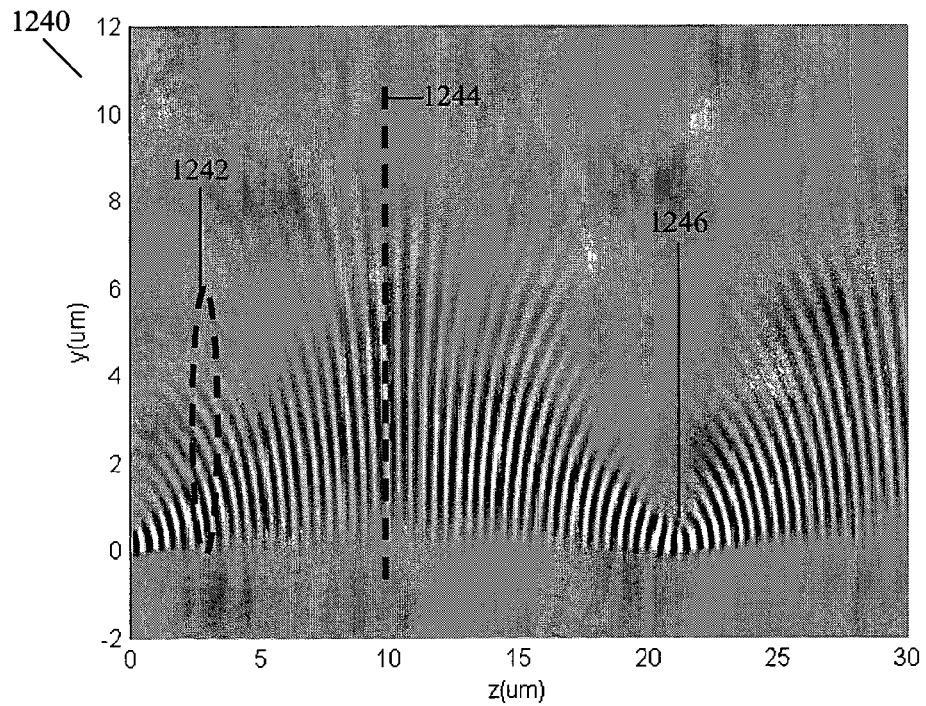

FIGS. 12B and 12C show simulation results 1220, 1240, of light propagation in an asymmetric aberration-free GRIN lens having the refractive index profile 1200 of FIG. 12A, based on ray-tracing and FDTD simulation of light propagation, respectively.

FIG. 12B shows the ray-tracing results 1220 in the asymmetric GRIN lens, in which a light beam 1222 including the rays, for example as represented by 1224a, 1226a, 1228a, 1230a, for four of the rays, originating from a point source 1232, are bent around or down from their respective peaks, in the GRIN lens due to the super-high NA of the GRIN lens to a single focus point 1234 (ie. the rays propagating in the GRIN lens converge to the same focus point 1234). Therefore, the asymmetric GRIN lens of various embodiments provide aberration-free focusing. In addition, the different rays do not cross with each other during propagation in the asymmetric GRIN lens of various embodiments. In comparison, a conventional GRIN lens with a parabolic refractive index profile experiences aberration, as shown in the ray tracing 800 of FIG. 8A.

As shown in FIG. 12B, the ray 1224a has a corresponding peak 1224b, while the ray 1228a has the peak 1228b. The dotted line 1236 is illustrated in FIG. 12B for the purpose of denoting the respective peaks of the respective rays propagating in the GRIN lens (ie. the dotted line 1236 represents the position where the beam 1222 is expanded to near its maximum size). The at least substantially vertical dotted line 1236 also shows that the respective peaks of the respective rays propagating in the GRIN lens, lie on an at least substantially vertical plane. In addition, as shown in FIG. 12B, the rays, for example as represented by 1224a, 1226a, 1228a, 1230a, for four of the rays, are at least substantially collimated and at least substantially parallel to each other, such that the rays, for example as represented by 1224a, 1226a, 1228a, 1230a, for four of the rays, form an at least substantially plane wavefront at an at least substantially vertical plane, for example as represented by the dotted line 1236, of the GRIN lens.

FIG. 12C shows the results 1240 of the full electromagnetic simulation using the FDTD method in the symmetric GRIN lens of various embodiments. As shown in FIG. 12C, the input light beam 1242 is expanded to near its maximum size, at the position represented by the dotted line 1244, and then focused to a focus point 1246. Furthermore, there is no observable interference during propagation of light in the symmetric GRIN lens as the different rays, as shown in the ray picture 1220 of FIG. 12B, do not cross with each other.

In addition, the wavefront, as represented by the dotted line 1244, when the beam is expanded to near its maximum size is an at least substantially vertical plane wavefront. This wavefront, as represented by the dotted line 1244, may be superimposed with the dotted line 1236 of FIG. 12B connecting the respective peaks of the different rays. The wavefront, as represented by the dotted line 1244, is generally approximately at the lens facet or where the light beam is coupled, for example, into an optical fiber. Hence, the substantially vertical wavefront, with minimal or no aberration, results in good coupling of the beam energy into the optical fiber. In comparison, a conventional GRIN lens with a parabolic refractive index profile experiences a curved wavefront, as represented by the curved line 822 and interference, as shown in the FDTD results 820 of FIG. 8B, thereby leading to poor optical coupling.

Various embodiments may provide a coupling, such as an optical coupling, between a waveguide (eg. a nanophotonic waveguide) to a fiber (eg. an optical fiber) using the aberration-free GRIN lens of various embodiments.

In order to use the aberration-free super-focusing lens of various embodiments for coupling between a nanophotonic waveguide and an optical fiber, optimisation of the structural parameters, such as the height D, length L and focusing length $L_f$ of the GRIN lens and the vertical position of the center of the fiber core, $h_f$, from the bottom surface of the GRIN lens, is required.

The coupling efficiency to a standard single mode fiber, such as SMF-28, may be calculated using the overlap integral between the eigenmode of the SMF-28 fiber and the expanded field from the lens, through a wide-angle beam propagation method (WA-BPM), which provides fast analysis and good agreement with FDTD simulation.

Using a coupling arrangement between the SMF-28 fiber and a nanophotonic waveguide with a core thickness of approximately 300 nm as an example, and based on the parameter-space scanning approach, the maximal coupling efficiency may be achieved with an aberration-free GRIN lens having a refractive index profile based on the parameters D=15.6 μm, L=16.85 μm and $L_f$=16 μm. The aberration-free GRIN lens has an at least substantially bell curve shaped refractive index profile (ie. a non-parabolic refractive index profile) ranging from about 3.5 to about 1.49, with a corresponding numerical aperture (NA) of about 3.167. The parameter $h_f$ is determined to be about 4.6 μm. Based on these optimised parameters, the corresponding maximal coupling efficiency from the nanophotonic waveguide, through the aberration-free GRIN lens, to the optical fiber is approximately 96.4%, according to the WA-BPM simulation.

Numerical simulation of light propagation in the aberration-free GRIN lens is also performed using the FDTD method and the maximal coupling efficiency is determined to be approximately 94.80% when the length L of the GRIN lens is about 16.84 μm while other parameters are maintained to be the same as that for the WA-BPM simulation. The results of the maximal coupling efficiency show that the two simulation methods based on the WA-BPM simulation and the FDTD show good agreement between the two methods.

Figure 13:
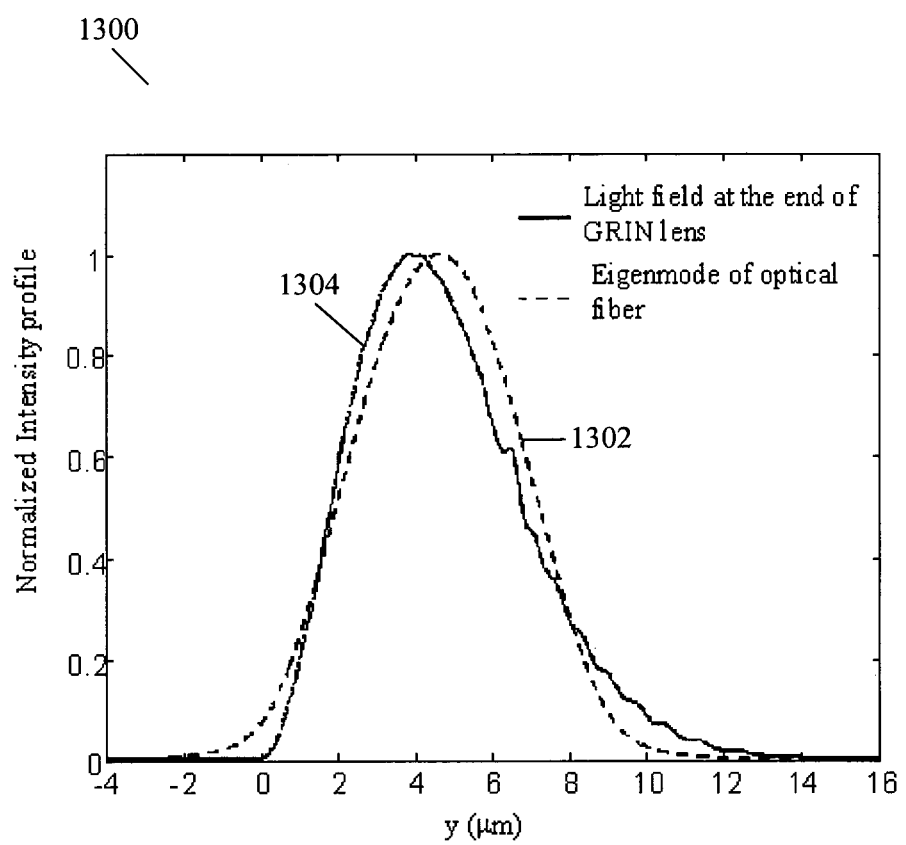
FIG. 13 shows a plot of normalized transverse intensity profiles of an eigenmode of a single mode fiber and an output field from an aberration-free GRIN lens of various embodiments.

FIG. 13 shows a plot 1300 of a normalised transverse intensity profile 1302 of an eigenmode of a single mode fiber and a normalised transverse intensity profile 1304 of an output field at a facet of an aberration-free GRIN lens of various embodiments, based on the optimised parameters, based on FDTD simulation. As shown in FIG. 13, the two normalised transverse intensity profiles 902, 904, are substantially matched to each other, illustrating that the light beam from the nanophotonic waveguide may be effectively expanded to match the mode field diameter of the optical fiber, thereby leading to good coupling efficiency between the nanophotonic waveguide and the optical fiber. In addition, no severe ripples are observed in the normalised transverse intensity profile 1304 of the aberration-free GRIN lens of various embodiments, in contrast to the ripples observed in the intensity profile 904 of FIG. 9 for a conventional GRIN lens with a parabolic refractive index profile. The slight intensity distortion in the normalised transverse intensity profile 1304 is due to the asymmetric nature of the refractive index profile of the GRIN lens of various embodiments.

Various embodiments may provide a method of forming a lens comprising a refractive index profile. The method includes forming a plurality of layers configured to generate the refractive index profile along a radial direction of the lens, wherein forming the plurality of layers comprises forming at least a first film and a second film arranged one above the other for each layer of the plurality of layers.

In various embodiments, the refractive index profile may be configured such that rays of light propagating in or through the lens may form an at least substantially plane wavefront at an at least substantially vertical plane of the lens. In various embodiments, this vertical plane may be within the lens and/or may be at a facet of the lens. In various embodiments, the refractive index profile may be configured to vary in an at least substantially bell curve shape along a radial direction of the lens.

In various embodiments, the first film includes a first material having a first refractive index and the second film includes a second material having a second refractive index, and wherein the first refractive index is higher than the second refractive index. In various embodiments, forming the plurality of layers may include, but not limited to, a thin film deposition process. The thin film deposition process may be used to deposit the first film and the second film of each layer of the plurality of layers. Accordingly, the lens of various embodiments, including the plurality of layers, may be formed via the thin film deposition process.

Various embodiments may provide a GRIN lens including a thin-film stack, to effectively provide the graded refractive index profile of the GRIN lens of various embodiments. Within the thin-film stack constituting the GRIN lens of various embodiments, using a dual-material approach, films of two different materials with different refractive indices, are deposited alternately to form the thin-film stack. Accordingly, a plurality of a first film including a first material and a second film including a second material is deposited alternately to form the thin-film stack. In various embodiments, the thin-film stack is equivalent to a plurality of layers, where each layer of the plurality of layers may include at least a first film and a second film arranged one above the other. In various embodiments, each layer of the plurality of layers may include a plurality of the first films and the second films, wherein the first films and the second films are arranged alternately.

Various embodiments may provide a dual-material method that may allow a high refractive index contrast to be effectively achieved using a thin film deposition technique. A high refractive index contrast provides a high numerical aperture (NA). In various embodiments, the lens, such as the super-focusing GRIN lens of various embodiments may be configured to have a super-high NA, for example about 3.167. In contrast, conventional approaches using ion-exchange technology or varying material composition produce a low refractive index contrast.

Various embodiments of the thin-film stack, may provide a coupling efficiency between a nanophotonic chip or a nanophotonic waveguide and an optical fiber of approximately 92%. In various embodiments, the thin-film stack-based GRIN lens may be wavelength insensitive within a wide wavelength range, which may enable the thin-film stack-based GRIN lens to be applied to, for example, photonic subsystems on chips employing the wavelength-division-multiplexing (WDM) with a broad optical bandwidth.

In various embodiments, the first material of the thin-film stack has a high refractive index, $n_H$ and the second material has a low refractive index, $n_L$, such that ($n_H > n_L$). In various embodiments, the first material may include, but not limited to, silicon (Si) and titanium dioxide ($TiO_2$), while the second material may include, but not limited to, silicon dioxide ($SiO_2$) and aluminium oxide ($Al_2O_3$). The refractive index for Si is about 3.5, $TiO_2$ is about 2.7, $SiO_2$ is about 1.5 while $Al_2O_3$ is about 1.76.

In various embodiments, the thickness of each of the first film and the second film may range from a few nanometers to tens of nanometers, depending on the required effective refractive index, $n_{eff}$ (where $n_H > n_{eff} > n_L$), to be achieved from the combination of the first film and the second film.

Various embodiments may provide a design under the dual-material approach to provide a GRIN lens including a plurality of layers that is aberration-free and super-focusing, similar to the embodiments illustrated in FIGS. 11 and 12 and the corresponding design parameters.

Figure 14A:
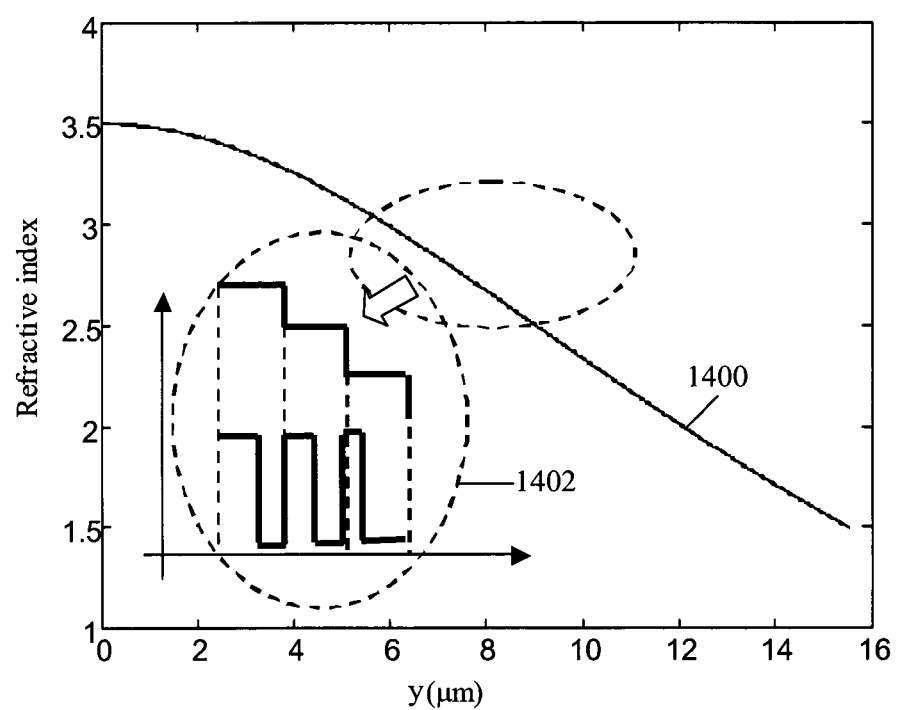
FIG. 14A shows a refractive index profile of an asymmetric aberration-free GRIN lens, according to various embodiments.

FIG. 14A shows a refractive index profile 1400 of an asymmetric aberration-free Super-GRIN lens along a radial direction of the lens (as represented by the axis denoted with y (μm), with y=0 referring to the bottom surface of the lens), according to various embodiments, for the optical design of a thin-film stack with an equivalent graded refractive index profile making up the Super-GRIN lens. As shown in FIG. 14A, the refractive index profile 1400 is a continuous graded refractive index profile, as a function of the depth of the lens, n(y). The Super-GRIN lens has a super-high numerical aperture with a refractive index variation, n(y) ranging from between about 3.5 to about 1.49.

In various embodiments, a method may be provided to transform the continuous GRIN refractive index profile n(y) 1400 into a binary refractive index profile under the dual-material approach. Any specific portion of the refractive index profile 1400 may be approximated by a binary refractive index profile as illustrated within the dotted oval 1402.

Figure 14B:
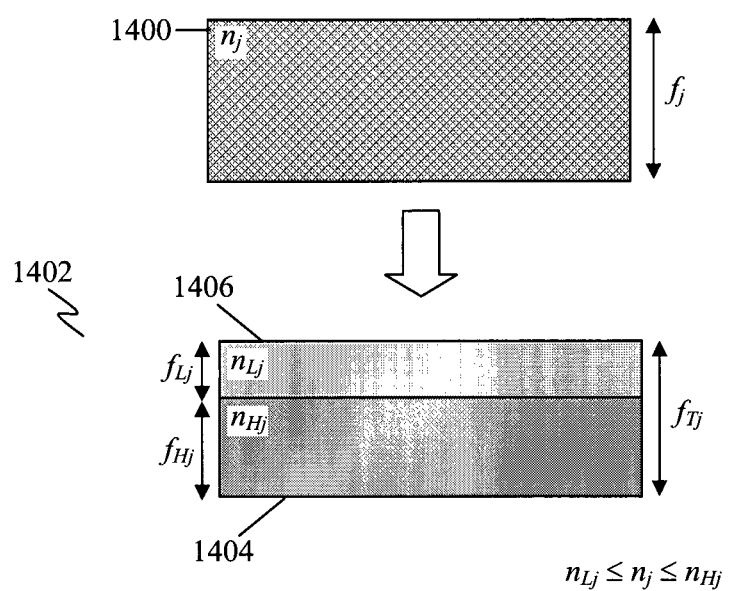
FIG. 14B shows a schematic layer of a GRIN lens and an equivalent combination of two films of different refractive indices based on a dual-material approach, according to various embodiments.
Figure 15A:
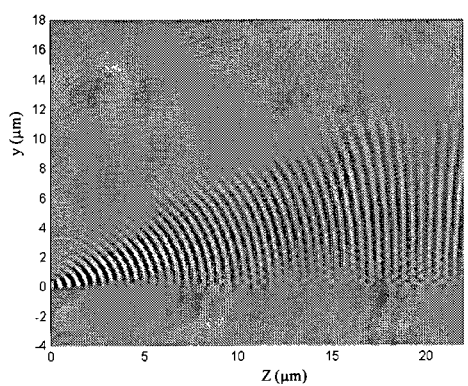
FIGS. 15A to 15D show simulation results of light propagation in a dual-material thin-film stack of various embodiments at different layer thicknesses, based on FDTD simulation.
Figure 15B:
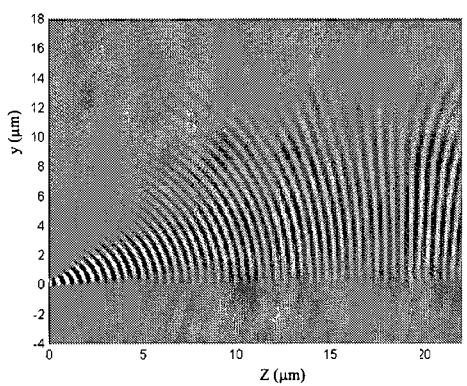
Figure 15C:
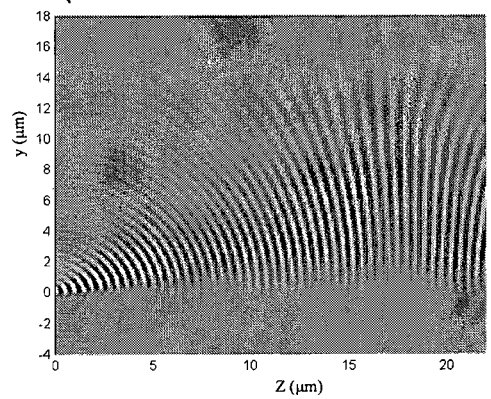
Figure 15D:
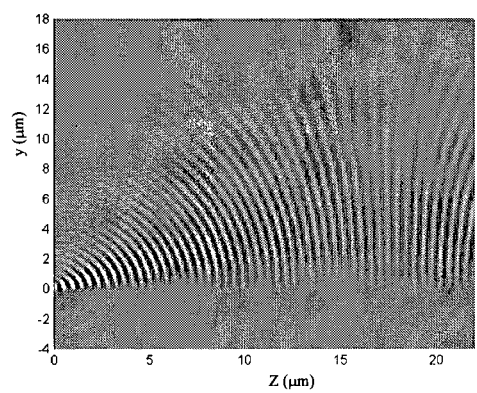

In various embodiments, the method may include two steps. The first step includes dividing the GRIN lens into M discretized layers and the thickness of the $j^{th}$ discretized layer 1400 is denoted as $f_t$ (where j=1, 2, 3, ... M), as shown in FIG. 14B. Within each $j^{th}$ discretized layer 1400, the refractive index $n_j$ (where j=1, 2, 3, ... M) may be regarded as a constant.

The second step, under the dual-material method, is to replace each discretised thin-film layer 1400 with an effective material with a total thickness $f_{Tj}$ and an effective refractive index $n_j$. In various embodiments, this effective material is made up of alternating two thin-film layers with respective refractive indices $n_{Hj}$ and $n_{Lj}$ (where $n_{Hj} > n_j > n_{Lj}$) and respective thicknesses $f_{Hj}$ and $f_{Lj}$ (where $f_{Tj} = f_{Hj} + f_{Lj}$). The thicknesses $f_{Hj}$ and $f_{Lj}$ may be determined based on averaging of dielectric permittivity, as given by the equations:

$$f_{Hj} = \frac{n_j^2 - n_{Lj}^2}{n_{Hj}^2 - n_{Lj}^2} f_{Tj}, \quad \text{(Equation 18)}$$

$$F_{Lj} = f_{Tj} - f_{Hj}, \quad \text{(Equation 19)}$$

so that the effective average refractive index, $n_{avg}$, may be given by the equation:

$$n_{avg}^2 = \frac{n_H^2 f_{Hj} + n_L^2 f_{Lj}}{f_{Tj}} = n_j^2. \quad \text{(Equation 20)}$$

Accordingly, in various embodiments, forming the plurality of layers includes determining a thickness of the first film based on equation 18, determining a thickness of the second film based on equation 19 and determining an effective refractive index for each layer of the plurality of layers comprising the at least first film and the at least second, based on equation 20.

In various embodiments, as shown in FIG. 14B, the equivalent effective material may be an equivalent layer of a dual-material pair 1402 with two thin films of different refractive indices. Therefore, each discretized layer 1400 may be replaced with the dual-material pair 1402. The dual-material pair 1402 includes a first film 1404 and a second film 1406, with the respective refractive indices $n_{Hj}$ and $n_{Lj}$ (where $n_{Hj} > n_j > n_{Lj}$) and the respective thicknesses $f_{Hj}$ and $f_{Lj}$. The total thickness of dual-material pair 1402 is $f_{Tj}$ (where $f_{Tj} = f_{Hj} + f_{Lj}$).

In further embodiments, the equivalent effective material may be an equivalent layer including a plurality of dual-material pairs. For example, the plurality of dual-material pairs may include two dual-material pairs, three dual-material pairs, four dual-material pairs or any number of dual-material pairs. Therefore, each discretized layer 1400 may be replaced with a plurality of dual-material pairs. In various embodiments, each dual-material pair of the plurality of dual-material pairs may be at least substantially similar to the dual-material pair 1402 of FIG. 14B. In various embodiments, each dual-material pair may have an at least substantially same or a different thickness, where the thickness of each dual-material pair contributes to the overall total thickness of the equivalent effective material. Accordingly, the effective refractive index of each dual-material pair may be at least substantially same or different, where the effective refractive index of each dual-material pair contributes to the overall effective refractive index of the equivalent effective material. In various embodiments, the first film of each dual-material pair may have a substantially same or a different thickness and/or the second film of each dual-material pair may have a substantially same or a different thickness.

In various embodiments, the thickness $f_j$ of each $j^{th}$ discretized layer 1400 may be at least substantially same or the thickness $f_j$ of each $j^{th}$ discretized layer 1400 may be different such that the thin-film stack of various embodiments has different discretized layers with different thicknesses.

In various embodiments, the thickness $f_{Tj}$ may be determined by the equation $$f_j/f_{Tj} = C_j \quad \text{(Equation 21)},$$

where $C_j$ is an integer describing the number of dual-material pair (eg. the dual-material pair 1402) in the $j^{th}$ discretized layer 1400. Accordingly, it should be appreciated that different dual-material designs or configurations may be implemented for a given GRIN profile n(y).

As an example and not limitations, for illustration and simplification purposes, $C_j$ is determined as 1 (ie. $C_j=1$) so that each discretized layer (eg. discretized layer 1400) is approximated by one dual-material pair (eg. dual-material pair 1402), similar to the embodiment shown in FIG. 14B. In addition, the thickness $f_j$ of each discretized layer is determined as f (ie. $f_j=f$), to be the same value for each of the discretized layer.

Therefore, for a thin-film stack with M discretized layers, the thickness of each layer may be given by the equation:

$$f = D/M \quad \text{(Equation 22)},$$

where D is the thickness of the thin-film stack.

For this example, as each layer of the M discretized layers includes a dual-material pair including two thin films, the thin-film stack has a total film number of $$N_f = 2M \quad \text{(Equation 23)}.$$

In various embodiments, the thicknesses of the two materials of the dual-material pair within each layer of the thin-film stack is determined through averaging the dielectric permittivity. In contrast, the conventional approach is to determine the thicknesses through averaging the refractive index. Various embodiments show that by averaging the dielectric permittivity, the thin-film stack designed and provided has a better performance in terms of the coupling efficiency between an optical fiber and a nanophotonic waveguide.

As an example and not limitations, the high refractive index material is silicon while the low refractive index material is silicon dioxide. In order to provide an aberration-free GRIN lens of various embodiments, the layout (eg. the thickness) of the silicon and silicon dioxide dual-material thin-film stack may be determined based on equations 18 and 19, for different layer thicknesses, f, and correspondingly different thin film number, $N_f$. Light propagation within the thin-film stack-based GRIN lens may be simulated using FDTD.

FIGS. 15A to 15D show simulation results (ie. light propagation patterns) 1500, 1502, 1504, 1506, of light propagation in a dual-material thin-film stack of various embodiments using the dielectric permittivity averaging approach, for f=300 nm ($N_f$=104), f=250 nm ($N_f$=124), f=200 nm ($N_f$=156), f=150 nm ($N_f$=208), based on FDTD simulation. As shown in FIGS. 15A to 15D, the two-material thin-film stack is configured to act as a GRIN lens of various embodiments, and expands the light beam with a sub-wavelength spot size, for example from a nanophotonic waveguide.

Figure 16:
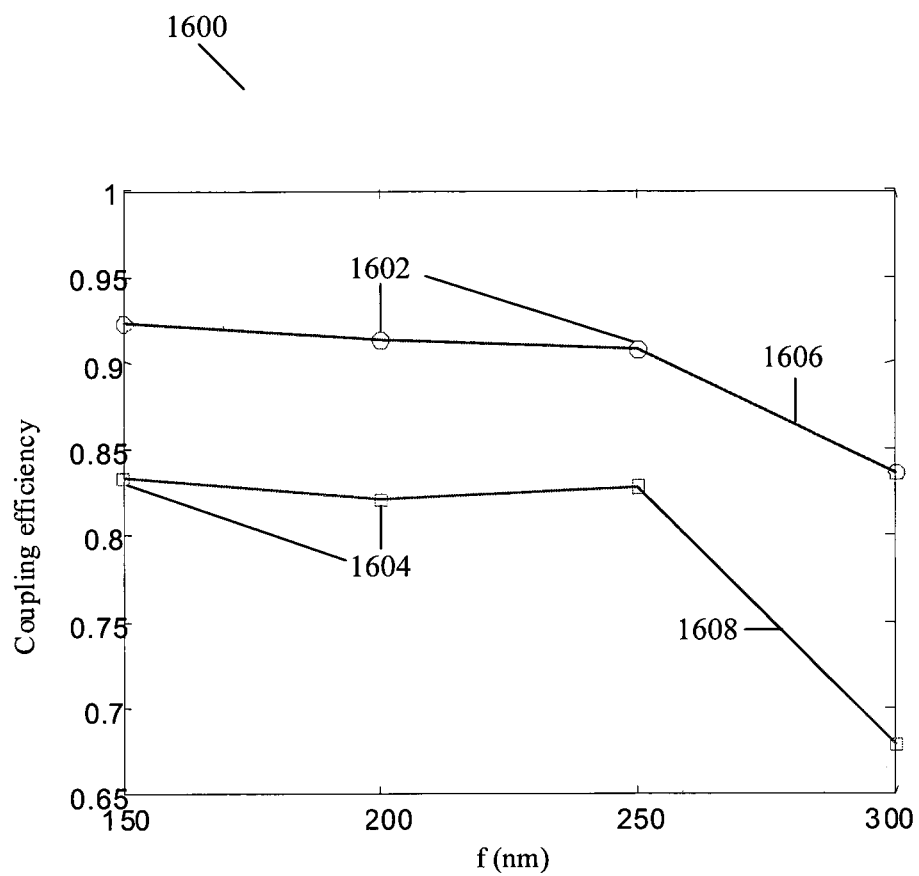
FIG. 16 shows a plot of coupling efficiency between an optical fiber and a nanophotonic waveguide based on the thin-film stack-based GRIN lenses of the embodiments of FIGS. 15A to 15D.

FIG. 16 shows a plot 1600 of coupling efficiency between an optical fiber and a nanophotonic waveguide based on the thin-film stack-based GRIN lenses of the embodiments of FIGS. 15A to 15D, represented as the circular (o) data points, as represented by 1602 for two of such data points. The coupling efficiency of thin-film stack-based GRIN lenses based on averaging of refractive index is also provided in FIG. 16 for comparison purposes, as represented by the square (□) data points, as represented by 1604 for two of such data points. The lines 1606, 1608, are drawn as guides. The coupling efficiency data shown in FIG. 16 were determined at the wavelength of about 1550 nm.

FIG. 16 shows that the thin-film stack-based GRIN lens of various embodiments based on the dielectric permittivity averaging approach results in a higher coupling efficiency 1602. The results show that when f is about 150 nm, the coupling efficiency 1602 reaches the maximal value of approximately 92%. Increasing the layer thickness, f, to over 250 nm (ie. thin-film stack with a thicker layer and correspondingly less number of layers $N_f$), results in a decrease in the coupling efficiency 1602 due to scattering loss.

Table 2 presents a design layout of a thin-film stack-based aberration-free GRIN lens of various embodiments for f=150 nm. For comparison purposes, a design layout of a thin-film stack based on a refractive index averaging approach is also presented. As shown in Table 2, the two different approaches lead to different layouts of the thin-film stacks.

TABLE 2

Layout of the thin-film stack designed for the aberration-free GRIN lens for f = 150 nm with a minimum layer thickness of 6 nm

| # | L1 | L2 |
|---|------|------|
| 1 | 1494 | 1794 |
| 2 | 6    | 6    |
| 3 | 144  | 144  |
| 4 | 6    | 6    |

TABLE 2-continued

Layout of the thin-film stack designed for the aberration-free GRIN lens for f = 150 nm with a minimum layer thickness of 6 nm

| # | L1 | L2 |
|---|---|---|
| 5 | 144 | 144 |
| 6 | 6 | 6 |
| 7 | 144 | 144 |
| 8 | 6 | 6 |
| 9 | 144 | 144 |
| 10 | 6 | 6 |
| 11 | 142 | 144 |
| 12 | 8 | 6 |
| 13 | 142 | 142 |
| 14 | 8 | 8 |
| 15 | 140 | 142 |
| 16 | 10 | 8 |
| 17 | 140 | 140 |
| 18 | 10 | 10 |
| 19 | 138 | 140 |
| 20 | 12 | 10 |
| 21 | 138 | 138 |
| 22 | 12 | 12 |
| 23 | 136 | 138 |
| 24 | 14 | 12 |
| 25 | 134 | 136 |
| 26 | 16 | 14 |
| 27 | 134 | 136 |
| 28 | 16 | 14 |
| 29 | 132 | 134 |
| 30 | 18 | 16 |
| 31 | 130 | 132 |
| 32 | 20 | 18 |
| 33 | 128 | 132 |
| 34 | 22 | 18 |
| 35 | 126 | 130 |
| 36 | 24 | 20 |
| 37 | 126 | 130 |
| 38 | 24 | 20 |
| 39 | 124 | 128 |
| 40 | 26 | 22 |
| 41 | 122 | 126 |
| 42 | 28 | 24 |
| 43 | 120 | 124 |
| 44 | 30 | 26 |
| 45 | 118 | 124 |
| 46 | 32 | 26 |
| 47 | 116 | 122 |
| 48 | 34 | 28 |
| 49 | 114 | 120 |
| 50 | 36 | 30 |
| 51 | 112 | 118 |
| 52 | 38 | 32 |
| 53 | 110 | 118 |
| 54 | 40 | 32 |
| 55 | 108 | 116 |
| 56 | 42 | 34 |
| 57 | 106 | 114 |
| 58 | 44 | 36 |
| 59 | 104 | 112 |
| 60 | 46 | 38 |
| 61 | 104 | 110 |
| 62 | 46 | 40 |
| 63 | 100 | 108 |
| 64 | 50 | 42 |
| 65 | 100 | 108 |
| 66 | 50 | 42 |
| 67 | 96 | 106 |
| 68 | 54 | 44 |
| 69 | 94 | 104 |
| 70 | 56 | 46 |
| 71 | 92 | 102 |
| 72 | 58 | 48 |
| 73 | 90 | 100 |
| 74 | 60 | 50 |
| 75 | 88 | 98 |
| 76 | 62 | 52 |
| 77 | 86 | 96 |
| 78 | 64 | 54 |
| 79 | 84 | 94 |
| 80 | 66 | 56 |
| 81 | 82 | 92 |
| 82 | 68 | 58 |
| 83 | 80 | 92 |
| 84 | 70 | 58 |
| 85 | 78 | 90 |
| 86 | 72 | 60 |
| 87 | 76 | 88 |
| 88 | 74 | 62 |
| 89 | 74 | 86 |
| 90 | 76 | 64 |
| 91 | 72 | 84 |
| 92 | 78 | 66 |
| 93 | 70 | 82 |
| 94 | 80 | 68 |
| 95 | 68 | 80 |
| 96 | 82 | 70 |
| 97 | 66 | 78 |
| 98 | 84 | 72 |
| 99 | 64 | 76 |
| 100 | 86 | 74 |
| 101 | 62 | 74 |
| 102 | 88 | 76 |
| 103 | 62 | 72 |
| 104 | 88 | 78 |
| 105 | 60 | 70 |
| 106 | 90 | 80 |
| 107 | 58 | 68 |
| 108 | 92 | 82 |
| 109 | 56 | 66 |
| 110 | 94 | 84 |
| 111 | 54 | 64 |
| 112 | 96 | 86 |
| 113 | 52 | 62 |
| 114 | 98 | 88 |
| 115 | 50 | 60 |
| 116 | 100 | 90 |
| 117 | 48 | 60 |
| 118 | 102 | 90 |
| 119 | 46 | 58 |
| 120 | 104 | 92 |
| 121 | 44 | 56 |
| 122 | 106 | 94 |
| 123 | 44 | 54 |
| 124 | 106 | 96 |
| 125 | 42 | 52 |
| 126 | 108 | 98 |
| 127 | 40 | 50 |
| 128 | 110 | 100 |
| 129 | 38 | 48 |
| 130 | 112 | 102 |
| 131 | 36 | 46 |
| 132 | 114 | 104 |
| 133 | 34 | 44 |
| 134 | 116 | 106 |
| 135 | 34 | 42 |
| 136 | 116 | 108 |
| 137 | 32 | 40 |
| 138 | 118 | 110 |
| 139 | 30 | 40 |
| 140 | 120 | 110 |
| 141 | 28 | 38 |
| 142 | 122 | 112 |
| 143 | 28 | 36 |
| 144 | 122 | 114 |
| 145 | 26 | 34 |
| 146 | 124 | 116 |
| 147 | 24 | 32 |
| 148 | 126 | 118 |
| 149 | 24 | 30 |
| 150 | 126 | 120 |
| 151 | 22 | 28 |
| 152 | 128 | 122 |
| 153 | 20 | 26 |
| 154 | 130 | 124 |

TABLE 2-continued

Layout of the thin-film stack designed for the aberration-free GRIN lens for f = 150 nm with a minimum layer thickness of 6 nm

| # | L1 | L2 |
|---|----|----|
| 155 | 20 | 26 |
| 156 | 130 | 124 |
| 157 | 18 | 24 |
| 158 | 132 | 126 |
| 159 | 16 | 22 |
| 160 | 134 | 128 |
| 161 | 16 | 20 |
| 162 | 134 | 130 |
| 163 | 14 | 18 |
| 164 | 136 | 132 |
| 165 | 14 | 16 |
| 166 | 136 | 134 |
| 167 | 12 | 16 |
| 168 | 138 | 134 |
| 169 | 10 | 14 |
| 170 | 140 | 136 |
| 171 | 10 | 12 |
| 172 | 140 | 138 |
| 173 | 8 | 10 |
| 174 | 142 | 140 |
| 175 | 8 | 8 |
| 176 | 142 | 142 |
| 177 | 6 | 8 |
| 178 | 144 | 142 |
| 179 | 6 | 6 |
| 180 | 144 | 144 |
| 181 | 6 | 6 |
| 182 | 144 | 444 |
| 183 | 6 | |
| 184 | 594 | |

: Layer number
Even number layers: SiO$_2$
Odd number layers: Si
L1: layout based on equations 18 and 19 based on dielectric permittivity averaging approach
L2: layout based on refractive index averaging approach As shown in Table 2, a thick buffer layer of silicon (Layer #1) is first deposited in between the thin-film stack and, for example, a substrate material in order to Minimise: leakage of light into the substrate. Layers of silicon with thicknesses ranging from approximately 144 nm to approximately 6 nm may be deposited. Layers of silicon dioxide with thicknesses ranging from approximately 6 nm to approximately 144 nm may be deposited. In various embodiments, the layers of silicon are at their thicket and the layers of silicon dioxide are at their thinnest for regions of high effective refractive index. Conversely, the layers of silicon are at their thinnest and the layers of silicon dioxide are at their thickest for regions of low effective refractive index.

Figure 17:
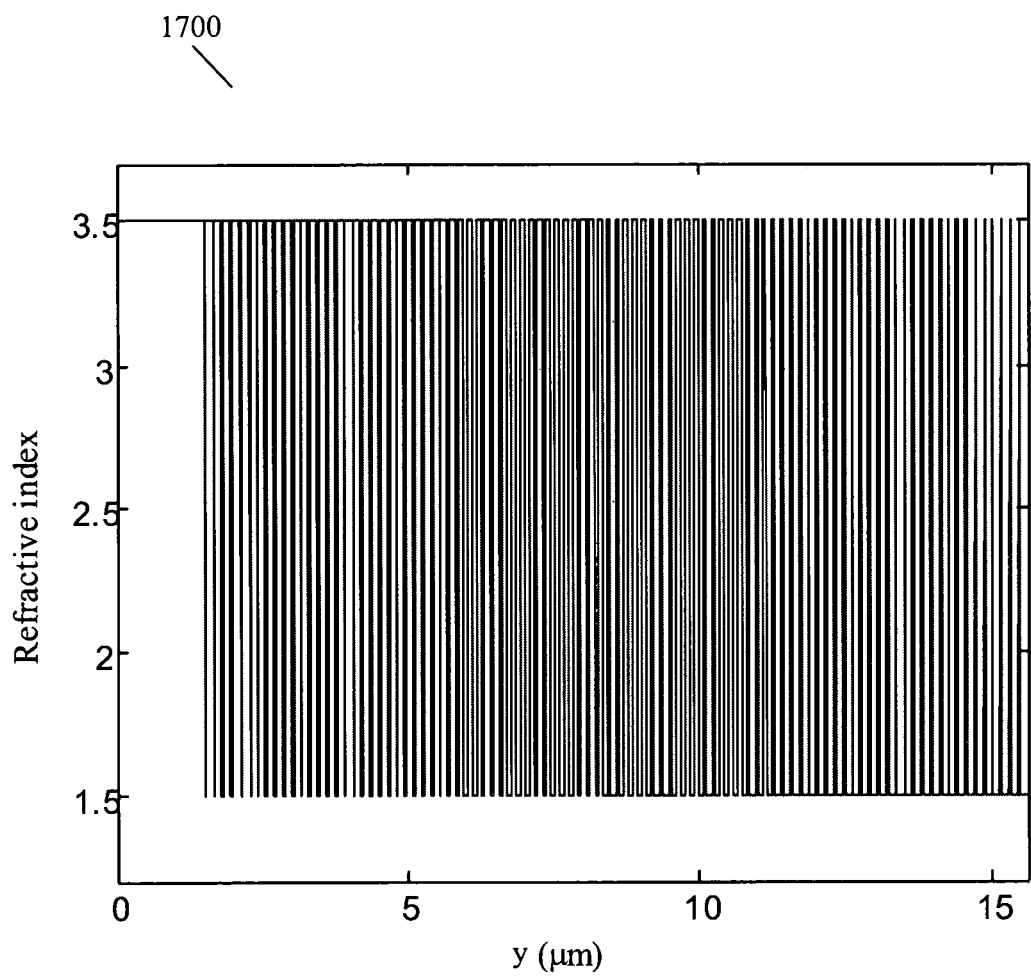
FIG. 17 shows a layout of an optical thin-film stack-based GRIN lens of various embodiments for a layer thickness of 150 nm.

Based on the layout shown in Table 2 and performance evaluation, FIG. 17 shows an optimal layout of an optical thin-film stack-based GRIN lens of various embodiments for a layer thickness of 150 nm (ie. f=150 nm) and a corresponding binary refractive index profile. The coupling efficiency between a nanophotonic waveguide and an optical fiber using a GRIN lens with a layout and a refractive index profile of FIG. 17 is approximately 92%.

Figure 18:
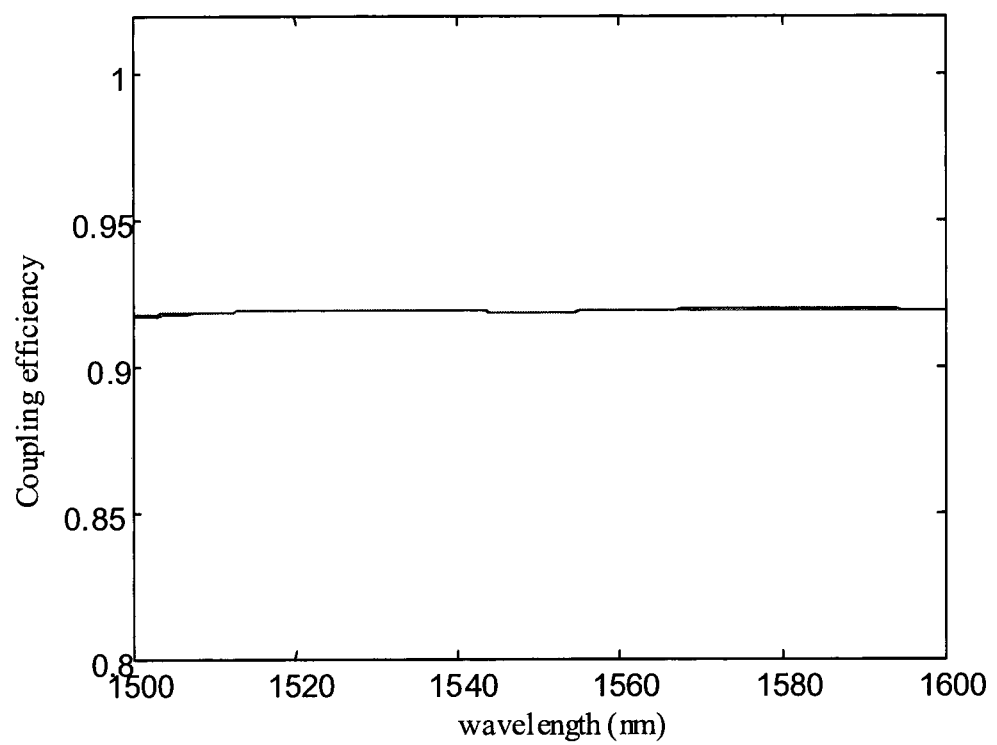
FIG. 18 shows a plot of coupling efficiency between an optical fiber and a nanophotonic waveguide at different wavelengths based on the thin-film stack-based GRIN lenses of the embodiment of FIG. 17.

The coupling efficiency between a nanophotonic waveguide and an optical fiber through the GRIN lens with a layout and a refractive index profile of FIG. 17 is also determined under different wavelengths, based on FDTD simulation. FIG. 18 shows the simulation results obtained, which show that the thin-film stack is at least substantially wavelength insensitive, with a variation of less than 0.5% (ie. <0.5%), over a wide wavelength range from about 1500 nm to about 1600 nm. Such a wavelength independency allows the GRIN lens with the thin-film stack to be applied to, for example, photonic subsystems on chips employing wavelength-division-multiplexing (WDM) with a broad optical bandwidth.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of generating a refractive index profile for a lens comprising a refractive index profile configured such that rays of light propagating in the lens form an at least substantially plane wavefront at an at least substantially vertical plane of the lens, the method comprising:
    dividing the lens into a plurality of layers, wherein a thickness of each layer of the plurality of layers is at least substantially same; and
    determining a refractive index of each layer of the plurality of layers, from a layer comprising a maximum refractive index to a layer comprising a minimum refractive index.

2. The method as claimed in claim 1, wherein determining the refractive index of each layer of the plurality of layers comprises approximating an input light as a point source, such that rays of light from the point source form an at least substantially plane wavefront at a focusing length of the lens.

3. The method as claimed in claim 2, wherein determining the refractive index of each layer of the plurality of layers further comprises:
    determining a first refractive index of a first layer, wherein the first refractive index is the maximum refractive index; and
    determining a second refractive index of a second layer arranged above the first layer from the following equation:

$$n_2 = \frac{L_f}{\sqrt{L_f^2 + h_i^2}} n_1$$

where
    $n_1$: refractive index of the first layer,
    $n_2$: refractive index of the second layer,
    $h_1$: thickness of each layer,
    $L_f$: focusing length of the lens.

4. The method as claimed in claim 3, wherein determining the refractive index of each layer of the plurality of layers further comprises:
    determining a refractive index of an i-th layer of the plurality of layers from the following equation:

$$L_f = \sum_{k=1}^{i-1} \frac{h_l}{\sqrt{\frac{n_k^2}{n_i^2} - 1}}$$

where
    $n_i$: refractive index of the i-th layer,
    $n_k$: refractive index of a k-th layer, wherein the k-th layer refers to the first layer to an (i−1)-th layer, and wherein the i-th layer is arranged above the (i−1)-th layer,
    $h_j$: thickness of each layer,
    $L_f$: focusing length of the lens.

5. The method as claimed in claim 3, wherein the first refractive index is at least substantially same as a refractive index of a waveguide core of a waveguide coupled to the lens.

* * * * *